US009060405B2

(12) United States Patent
Kim et al.

(10) Patent No.: US 9,060,405 B2
(45) Date of Patent: Jun. 16, 2015

(54) APPARATUS FOR CONTROLLING THE OPERATION OF AN LED, AND METHOD FOR CONTROLLING DRIVE CURRENT THEREOF

(71) Applicant: Korea Electrotechnology Research Institute, Changwon-si, Gyeongsangnam-do (KR)

(72) Inventors: Jong Hyun Kim, Changwon-si (KR); Myung Hyo Ryu, Changwon-si (KR); Ju Won Baek, Changwon-si (KR); Kill Soo Seo, Changwon-si (KR); Hyoung Woo Kim, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 0 days.

(21) Appl. No.: 14/088,774

(22) Filed: Nov. 25, 2013

(65) Prior Publication Data

US 2014/0097763 A1    Apr. 10, 2014

Related U.S. Application Data

(63) Continuation of application No. PCT/KR2012/004109, filed on May 24, 2012.

(30) Foreign Application Priority Data

May 26, 2011  (KR) .................. 10-2011-0049885
Nov. 3, 2011   (KR) .................. 10-2011-0113848
Nov. 3, 2011   (KR) .................. 10-2011-0113891

(51) Int. Cl.
*H05B 33/08* (2006.01)
*H05B 37/02* (2006.01)

(52) U.S. Cl.
CPC ........ *H05B 33/0845* (2013.01); *H05B 33/0824* (2013.01); *H05B 33/0809* (2013.01); *H05B 37/02* (2013.01)

(58) Field of Classification Search
CPC .......... H05B 33/0824; H05B 33/0815; H05B 33/0812; H05B 33/083; H05B 33/0878; H05B 37/02; Y02B 20/346; Y02B 20/342; G09F 9/33; Y10S 362/80
USPC ............. 315/51, 53, 122, 144, 188, 193, 235, 315/312
See application file for complete search history.

(56) References Cited

U.S. PATENT DOCUMENTS

| 7,946,731 | B1 * | 5/2011 | Wray ............................ 362/294 |
| 2002/0043943 | A1 * | 4/2002 | Menzer et al. ................ 315/291 |
| 2012/0176037 | A1 * | 7/2012 | Lee ................................ 315/122 |
| 2012/0248986 | A1 * | 10/2012 | Gibbs ........................... 315/122 |

(Continued)

FOREIGN PATENT DOCUMENTS

| JP | 2006-147933 A | 6/2006 |
| JP | 2006-179672 A | 7/2006 |

(Continued)

OTHER PUBLICATIONS

International Search Report, PCT/KR2012/004109, WIPO, Nov. 29, 2012.

(Continued)

*Primary Examiner* — Vibol Tan
(74) *Attorney, Agent, or Firm* — Park & Associates IP Law, P.C.

(57) ABSTRACT

The present invention relates to an apparatus for controlling the operation of an LED and to a method for controlling the drive current thereof. More particularly, the present invention relates to an apparatus for controlling the operation of an LED, which is capable of driving a direct current-operated LED module or an alternating current-operated LED module using alternating current power, and to a method for controlling the drive current of the apparatus. According to the present invention, the drive current of an LED array can be output in the form of a sine wave by a constant-current regulation or constant-power regulation even when input voltage varies, thus suppressing harmonics, improving the power factor, minimizing flicker, and preventing a temperature increase in the LED array and in an LED operation control circuit.

9 Claims, 21 Drawing Sheets

(56) References Cited

U.S. PATENT DOCUMENTS

2012/0256547 A1* 10/2012 Yang .............................. 315/144
2013/0043799 A1* 2/2013 Siu et al. ....................... 315/193

FOREIGN PATENT DOCUMENTS

| JP | 2009-93216 A | 4/2009 |
| JP | 2009-230973 A | 10/2009 |
| KR | 10-2008-0080012 A | 9/2008 |
| KR | 10-2011-0045263 A | 5/2011 |
| KR | 10-2011-0090201 A | 8/2011 |

OTHER PUBLICATIONS

Japanese Office Action (JP 2014-512759), Nov. 25, 2014.

* cited by examiner (a)

(b)

(a)

(b)

(a)

(b)

(a)

(b)

(a)

(b)

(a)

(b)

(a)

(b)

(a)

(b)

APPARATUS FOR CONTROLLING THE OPERATION OF AN LED, AND METHOD FOR CONTROLLING DRIVE CURRENT THEREOF

REFERENCE TO RELATED APPLICATIONS

This is a continuation of pending International Patent Application PCT/KR2012/004109 filed on May 24, 2012, which designates the United States and claims priority of Korean Patent Application No. 10-2011-0049885 filed on May 26, 2011, Korean Patent Application No. 10-2011-0113848 filed on Nov. 3, 2011, and Korean Patent Application No. 10-2011-0113891 filed on Nov. 3, 2011, the entire contents of which are incorporated herein by reference.

FIELD OF THE INVENTION

The present invention relates generally to an apparatus for controlling the operation of light-emitting diodes (LEDs) and a method of controlling the driving current thereof and, more particularly, to an apparatus for controlling the operation of LEDs and a method of controlling the driving current thereof, which are capable of operating a direct current (DC)-operated LED module or an alternating current (AC)-operated LED module using an AC power source.

BACKGROUND OF THE INVENTION

In general, an LED module may be basically divided into a DC-operated LED module and an AC-operated LED module depending on the type of power that is received in order to operate the LED module.

FIG. 1 is a circuit diagram of a conventional AC-operated LED module.

As shown in FIG. 1, the conventional circuit 1 for operating an AC LED module includes an AC power source 10, a first LED module 20, a second LED module 30, and a resistor 40.

The conventional circuit 1 for operating an AC LED module will be described below with reference to FIG. 1. First, when an input voltage Vac supplied by the AC power source 10 is applied in a positive direction (that is, for a positive half cycle of the AC voltage), a current flows in the order of R1, D1, D2, ~, Dn−1, Dn, Dn+1, Dn+2, ~, D2n−1, and D2n, and thus the first LED module 20 and the second LED module 30 are operated. When the input voltage supplied by the AC power source 10 is applied in a negative direction (that is, for a negative half cycle of the AC voltage), a current flows in the order of R1, D2n, D2n+1, ~, Dn+2, Dn+1, Dn, Dn−1, ~, D2, and D1, and thus the first LED module 20 and the second LED module 30 are operated.

In this case, the magnitude of the current may be determined by the resistor 40 connected between the output side of the AC power source 10 and the input side of the first LED array 20.

As described above, the conventional circuit 1 for operating an AC LED module is advantageous in that it has a simple configuration, but is problematic in that the input voltage from the AC power source 10 needs to be always supplied as a constant voltage in order to supply a constant current to the first LED module 20 and the second LED module 30, and in that a section in which a current flows is narrow because the current flows when the input voltage is higher than the forward voltage of 2n LEDs, thereby lowering a power factor.

Furthermore, the conventional circuit 1 for operating an AC LED module using only the resistor 40 is problematic in that a flicker phenomenon, that is, a phenomenon in which light flickers, may be generated because the operation of a constant current for securing the lifespan and optical characteristics of an LED device is very limited, and in that the lifespan of an LED device is reduced because the operation voltage of the LED device that varies depending on temperature and the forward loss voltage of the LED device cannot be maintained.

SUMMARY OF THE INVENTION

The present invention has been made keeping in mind the above problems occurring in the prior art, and an object of the present invention is to provide an apparatus for controlling the operation of LEDs and a method of controlling the driving current thereof, which are capable of continuously maintaining the control of a constant current or the control of constant power with respect to an input current, thereby suppressing harmonics, improving a power factor, preventing a flicker phenomenon, and preventing a rise in the temperature of an LED and the temperature of a driving control circuit.

In accordance with a preferred embodiment of the present invention, there is provided an apparatus for controlling operation of LEDs using an AC power source, including an LED array configured to have an input side connected to an output side of the AC power source; an operation control voltage generation unit configured to have a first side connected to the LED array; and an operating current control unit configured to have a first side connected to the operation control voltage generation unit and the LED array, to have a second side connected to an input side of the AC power source, to operate in response to a voltage generated by the operation control voltage generation unit, and to perform constant current control of a plurality of input currents received through one or more LEDs of the LED array.

In accordance with another preferred embodiment of the present invention, there is provided an apparatus for controlling the operation of LEDs using an AC power source, including an LED array configured to have an input side connected to an output side of the AC power source; a rectification unit connected between an input side of the AC power source and an input side of the LED array, and connected to an output side of the LED array; an operation control voltage generation unit configured to have a first side connected to an output side of the rectification unit; and an operating current control unit configured to have a first side connected to the output side of the rectification unit and a driving control power generation unit, to operate in response to power generated by the driving control power generation unit, and to perform constant current control of a plurality of input currents received through the rectification unit or one or more LEDs of the LED array.

In accordance with still another preferred embodiment of the present invention, there is provided an apparatus for controlling the operation of LEDs using an AC power source, including an LED array configured to have an input side connected to an output side of the AC power source; a rectification unit connected between the output side of the AC power source and the input side of the LED array; an operation control voltage generation unit configured to have a first side connected to the LED array and a second side connected to the rectification unit; and an operating current control unit configured to have a first side connected to the operation control voltage generation unit and the LED array and a second side connected to the rectification unit, to operate in response to a voltage generated by the operation control voltage generation unit, and to control a plurality of input currents received through one or more LEDs of the LED array.

In accordance with still another preferred embodiment of the present invention, there is provided an apparatus for controlling the operation of LEDs using an AC power source, including a first LED array configured to have a first side connected to an output side of the AC power source; a second LED array configured to have a first side connected to an input side of the AC power source; a rectification unit configured to have an input side connected between the output side of the AC power source and the first side of the first LED array, between the input side of the AC power source and the first side of the second LED array, to a second side of the first LED array, and to a second side of the second LED array; and an operation control unit configured to have an input side connected to an output side of the rectification unit and an output side connected to the input side of the rectification unit and to control a plurality of input currents output from the rectification unit and then received through the input side of the operation control unit so that the plurality of input currents is selectively output to the second side of the first LED array and the second side of the second LED array.

In accordance with still another preferred embodiment of the present invention, there is provided a method of controlling a driving current of an apparatus for controlling operation of LEDs, the apparatus being operated by an AC power source and including a plurality of LED arrays, a rectification unit, and an operation control unit, the method including the steps of: (a) inputting a plurality of input currents to the operation control unit through the rectification unit or the plurality of LED arrays in response to a change in magnitude of an input voltage supplied by the AC power source; and (b) selectively sending one or more of the plurality of input currents input to the operation control unit to the plurality of LED arrays.

In accordance with still another preferred embodiment of the present invention, there is provided a method of controlling a driving current of an apparatus for controlling operation of LEDs, the apparatus being operated by an AC power source and including a plurality of LED arrays, a rectification unit, and an operation control unit, the method including the steps of: (a) comparing a magnitude of a predetermined reference current with magnitudes of a plurality of input currents input to the operation control unit through the rectification unit or the plurality of LED arrays in response to a change in magnitude of an input voltage supplied by the AC power source; (b) if, as a result of the comparison, at least one input current higher than the reference current is sensed, decreasing the magnitude of the at least one sensed input current, and performing constant current control of the at least one sensed input current; and (c) if, as a result of the comparison, at least one input current lower than the reference current is sensed, increasing the magnitude of the at least one sensed input current, and performing constant current control of the at least one sensed input current.

In accordance with still another preferred embodiment of the present invention, there is provided a method of controlling a driving current of an apparatus for controlling operation of LEDs, the apparatus being operated by an AC power source and including a plurality of LED arrays, a rectification unit and an operation control unit, the method including the steps of: (a) receiving a plurality of input currents input to the operation control unit through the rectification unit or the plurality of LED arrays in response to a change in magnitude of an input voltage supplied by the AC power source, and amplifying the plurality of input currents; and (b) performing constant power control by controlling magnitudes of the plurality of input currents, configured to correspond to a plurality of proportional voltage values generated as a result of the amplification and input to the operation control unit through the rectification unit or the plurality of LED arrays in response to the change in magnitude of input voltage supplied by the AC power source, based on the plurality of proportional voltage values.

In accordance with the present invention, the driving current of the LED array can be output in a sine wave form through the constant current control or constant power control even when input voltage fluctuates, thereby achieving advantages of suppressing harmonics, improving a power factor, minimizing a flicker phenomenon, and preventing a rise in temperature of the LED array and temperature of the LED driving control circuit.

Furthermore, the present invention is advantageous in that the circuit configuration of the apparatus for controlling the operation of LEDs can be simplified and the costs required to construct the corresponding circuit can be reduced due to the simplified circuit configuration.

DETAILED DESCRIPTION OF THE INVENTION

Preferred embodiments of the present invention will be described in detail below with reference to the accompanying drawings. First, it should be noted that in the assignment of reference symbols to the elements of the drawings, the same reference symbols are assigned to the same elements as much as possible even when they are shown in different drawings. Furthermore, in the description of the present invention, if detailed descriptions of related known functions and configurations are deemed to make the gist of the present invention obscure, they will be omitted. Moreover, although preferred embodiments of the present invention will be described below, the technical spirit of the present may be practiced without being restricted or limited to the preferred embodiments.

Figure 1:
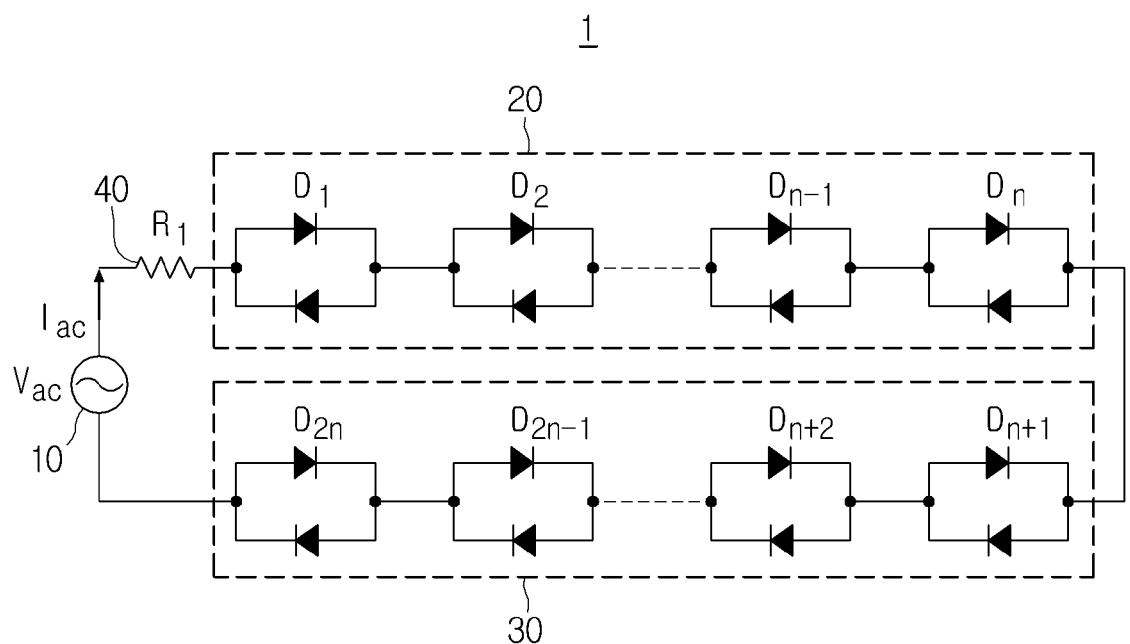
FIG. 1 is a circuit diagram of a conventional AC-operated LED module.
Figure 2:
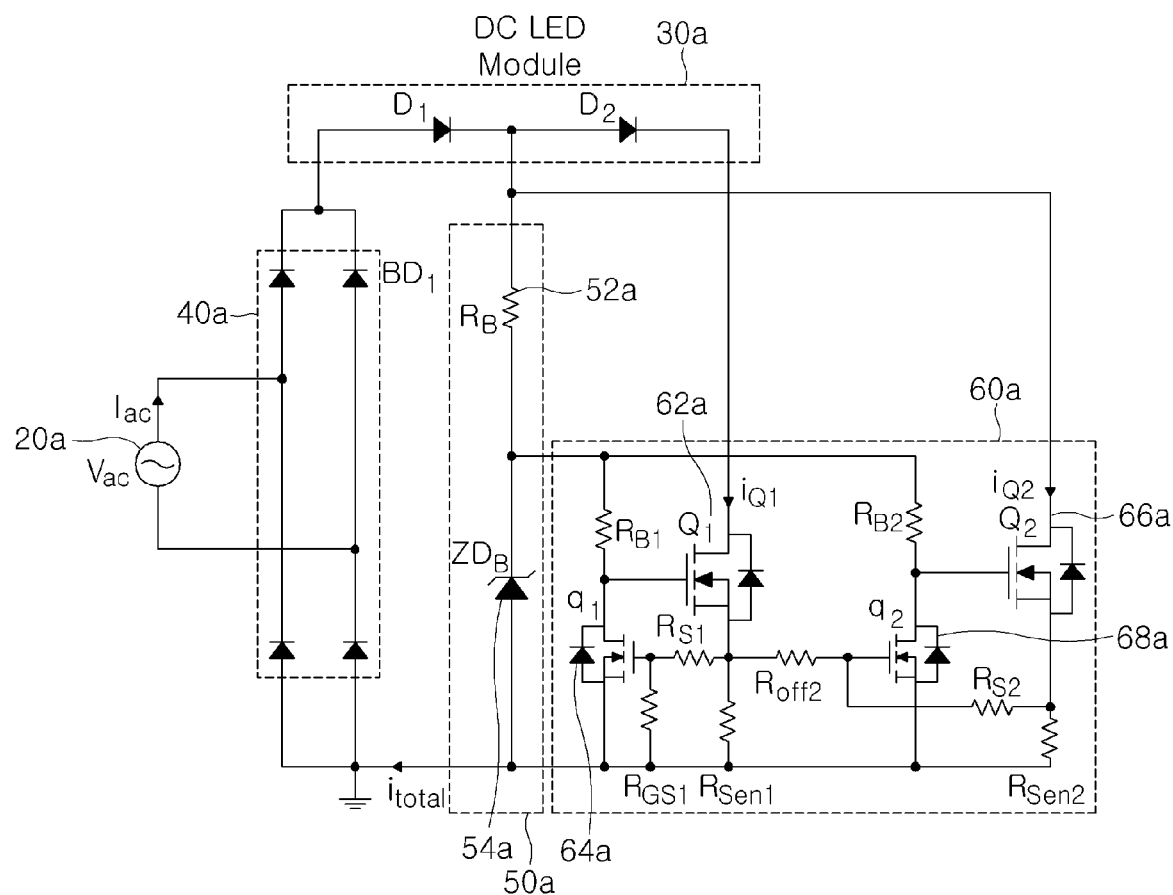
FIG. 2 is a circuit diagram of an apparatus for controlling the operation of LEDs according to a first embodiment of the present invention.

FIG. 2 is a circuit diagram of an apparatus for controlling the operation of LEDs according to a first embodiment of the present invention.

As shown in FIG. 2, the apparatus 10a for controlling the operation of LEDs according to the first embodiment of the present invention includes an AC power source 20a, an LED array 30a, a rectification unit 40a, an operation control voltage generation unit 50a, and an operating current control unit 60a.

The AC power source 20a supplies power for the operation of the LED array 30a, and the input side of the LED array 30a is connected to the output side of the AC power source 20a.

The LED array 30a includes a plurality of LEDs that are connected in series. Each of the LEDs may be a DC-operated LED that is operated by DC power.

The rectification unit 40a is connected between the output side of the AC power source 20a and the input side of the LED array 30a. In greater detail, the output side of the rectification unit 40a is connected to the input side of the LED array 30a, and the input side of the rectification unit 40a is connected to the operation control voltage generation unit 50a and the operating current control unit 60a. The rectification unit 40a rectifies power supplied by the AC power source 20a, and then outputs the rectified power to the LED array 30a.

The rectification unit 40a may include a plurality of diode pairs that are connected in a forward direction.

The operation control voltage generation unit 50a has one side connected to the LED array 30a, and the other side connected to the rectification unit 40a. The operation control voltage generation unit 50a receives a current that passes through a specific LED (e.g., D1 of FIG. 2) of the LED array 30a, and generates voltage for the operation of the operating current control unit 60a using the received current.

The operation control voltage generation unit 50a may include a resistor RB configured to have one side connected to the LED array 30a, and a Zener diode ZDB connected in series to the other side of the resistor RB.

The operating current control unit 60a has one side connected to the operation control voltage generation unit 50a and the LED array 30a, and the other side connected to the input side of the AC power source 20a. The operating current control unit 60a operates in response to the voltage generated by the operation control voltage generation unit 50a, and performs the constant current control of a plurality of input currents received through one or more LEDs of the LED array 30a.

In this case, the operating current control unit 60a includes a first switch 62a configured to have one side connected to the output side of the LED array 30a and to receive a first input current belonging to the plurality of input currents and passing through the LED array 30a (that is, the LEDs D1 and D2 of the LED array 30a), a first current control unit 64a connected to the first switch 62a and configured to perform the constant current control of the first input current, a second switch 66a configured to have one side connected to the LED array 30a and to receive a second input current belonging to the plurality of input currents and passing through a specific LED (e.g., D1) of the LED array 30a, and a second current control unit 68a connected to the second switch 66a and configured to perform the constant current control of the second input current or to turn off the second switch 66a.

Furthermore, each of the first and second switches 62a and 66a may be a MOSFET or a transistor, the first current control unit 64a may be a MOSFET, a transistor or a shunt regulator, and the second current control unit 68a may be a MOSFET or a transistor.

The operation of the apparatus 10a for controlling the operation of LEDs according to the first embodiment of the present invention will be described below with reference to FIG. 2.

First, when a voltage supplied by the AC power source 20a rises and becomes higher than 50% of the total forward voltage of the LED array 20a, the second input current passes through the rectification unit 40a and a specific LED (e.g., D1) of the LED array 20a, and the second input current is input to the operation control voltage generation unit 50a and the second switch 66a of the operating current control unit 60a.

Furthermore, the first switch 62a and the second switch 66a operate and then enter an ON state in response to the second input current input to the operation control voltage generation unit 50a, and the second input current input to the second switch 66a passes through the second switch 66a.

In this case, the second input current may function as an auxiliary current for the improvement of a power factor, and may also function to minimize a flicker phenomenon by operating a specific LED (e.g., D1) of the LED array 30a.

Furthermore, the second input current passing through the second switch 66a is changed into voltage through a resistor Rsen2 connected to the second switch 66a. The changed voltage passes through a resistor RS2, and operates the second current control unit 68a connected to the second switch 66a (that is, the changed voltage operates the gate of the second current control unit 68a).

The changed voltage that operates the second current control unit 68a may be a partial voltage that is determined by the resistor RS2 and a resistor ROFF2. Accordingly, the second input current flowing through the second switch 66a can be regularly controlled because the magnitude of voltage at the gate of the second switch 66a is controlled by the operation of the second current control unit 68a.

When the voltage supplied by the AC power source 20a is higher than the total forward voltage of the LED module 30a, the first input current passes through the rectification unit 40a, passes through the output side of the LED module 30a (that is, the LEDs D1 and D2 of the LED module 30a), and is input to the first switch 62a.

In this case, the first input current input to the first switch 62a passes through the first switch 62a because the first switch 62a enters an ON state in response to the voltage generated by the operation control voltage generation unit 50a.

In this case, the first input current may function as a main current that operates the LED array 30a.

Furthermore, the first input current is changed into voltage through a resistor Rsen1 connected in series to the first switch 62a. The changed voltage operates the first current control unit 64a connected to the first switch 62a through a resistor RS1 (that is, the changed voltage operates the gate of the first current control unit 64a).

In this case, the voltage that operates the first current control unit 64a may be a partial voltage that is determined by the resistor RS1 and a resistor RGS1. Accordingly, the first input current flowing through the first switch 62a can be regularly controlled because the magnitude of the voltage at the gate of the first switch 62a is controlled by the operation of the first current control unit 64a.

Furthermore, when the first current control unit 64a operates, the voltage of the resistor Rsen1 connected in series to the first switch 62a operates the second current control unit 68a through the resistor Roff2 (that is, the voltage of the resistor Rsen1 turns on the second current control unit 68a), thereby turning off the second switch 66a. Accordingly, the second input current input to the second switch 62a can be prevented from flowing through the second switch 66a.

Accordingly, in accordance with the apparatus 10a for controlling the operation of LEDs according to the first embodiment of the present invention, the operation control voltage generation unit 50a for generating voltage for the operation of the operating current control unit 60a includes the resistor 52a and the Zener diode 54a, and the second current control unit 68a performs the constant current control of the second input current input to the second switch 66a through a specific LED (e.g., D1) of the LED array 20a and an operation of turning off the second switch 66a. Accordingly, the configuration of the corresponding circuit can be simplified and the cost required to construct the circuit can be reduced, as compared with a prior art.

Figure 3:
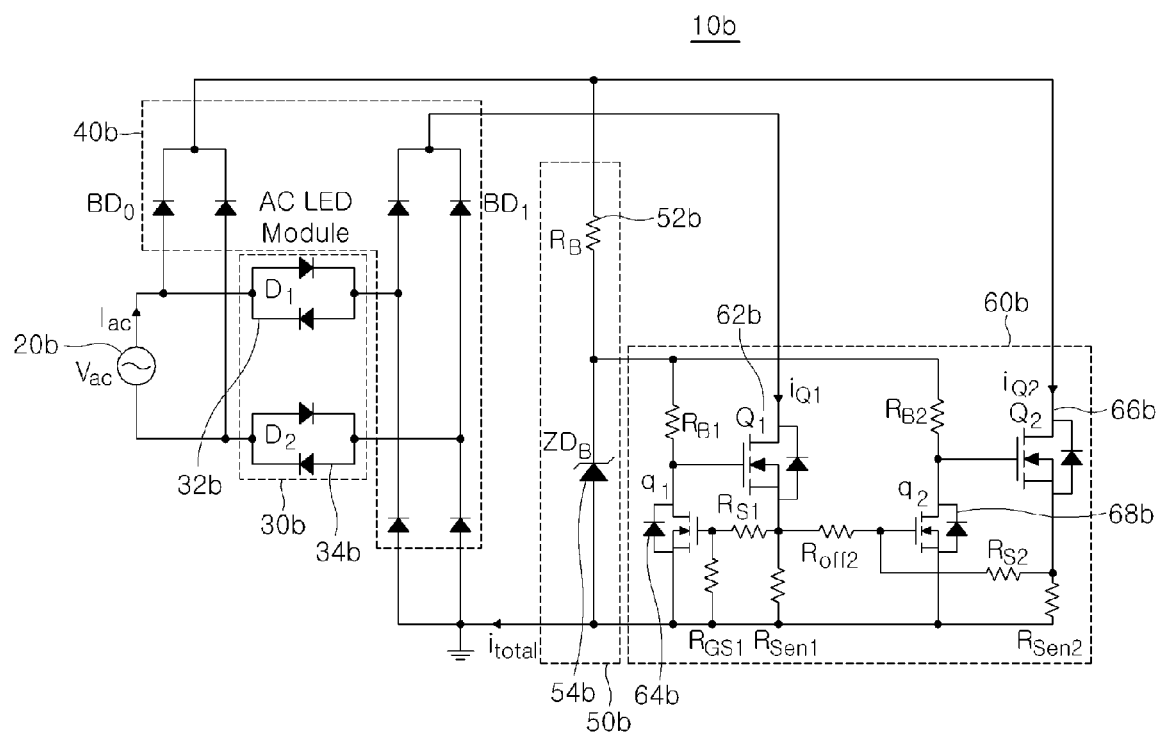
FIG. 3 is a circuit diagram of an apparatus for controlling the operation of LEDs according to a second embodiment of the present invention.

FIG. 3 is a circuit diagram of an apparatus for controlling the operation of LEDs according to a second embodiment of the present invention.

As shown in FIG. 3, the apparatus for controlling the operation of LEDs 10b according to the second embodiment of the present invention includes an AC power source 20b, an LED array 30b, a rectification unit 40b, an operation control voltage generation unit 50b, and an operating current control unit 60b.

The AC power source 20b supplies power for the operation of the LED array 30b, and the input side of the LED array 30b is connected to the output side of the AC power source 20b.

The LED array 30b includes a plurality of LED pairs 32b and 34b that are connected in parallel in a backward direction. Each of the LEDs of the LED pairs 32b and 34b may be an AC-operated LED that is operated by AC power.

The rectification unit 40b is connected between the input side of the AC power source 20b and the input side of the LED array 30b and between the input side of the AC power source 20b and the output side of the LED array 30b. The rectification unit 40b rectifies the power received from the AC power source 20b and outputs the rectified power to the operation control voltage generation unit 50b and the operating current control unit 60b, or rectifies power passing through a specific LED pair (e.g., D1) of the LED array 30b and outputs the rectified power to the operating current control unit 60b.

The rectification unit 40b may include a plurality of diode pairs BD1 that are connected in a forward direction.

The operation control voltage generation unit 50b has one side connected to the output side of the rectification unit 40b and the other side connected to the input side of the rectification unit 40b. The operation control voltage generation unit 50b receives a current supplied by the AC power source 20b and then rectified by the rectification unit 40b, and generates a voltage for the operation of the operating current control unit 60b using the current.

The operation control voltage generation unit 50b may include a resistor RB configured to have one side connected to the rectification unit 40b, and a Zener diode ZDB connected in series to the other side of the resistor RB.

The operating current control unit 60b has one side connected to the output side of the rectification unit 40b and to the operation control voltage generation unit 50b, operates in response to the voltage generated by the driving control power generation unit 50b, and performs the constant current control of a plurality of input currents that pass through the rectification unit 40b or at least one LED of the LED array 30b.

The operating current control unit 60b includes a first switch 62b configured to have one side connected to the output side of the rectification unit 40b (that is, the output side of the diode pair BD1 included in the rectification unit 40b) and to receive a first input current belonging to the plurality of input currents and passing through the LED array 30b, a first current control unit 64b connected to the first switch 62b and configured to perform the constant current control of the first current, a second switch 66b configured to have one side connected to the output side of the rectification unit 40b (that is, the output side of the diode pair BD0 included in the rectification unit 40b) and to receive a second input current belonging to the plurality of input currents and passing through the rectification unit 40b (that is, the diode pair BD0 of the rectification unit 40b) after being supplied by the AC power source 20b, and a second current control unit 68b connected to the second switch 66b and configured to perform the constant current control of the second current or to turn off the second switch 66b.

The first and second switches 62b and 66b may be MOSFETs or transistors, the first current control unit 64b may be a MOSFET, a transistor or a shunt regulator, and the second current control unit 68b may be a MOSFET or a transistor.

The operation of the apparatus for controlling the operation of LEDs 10b according to the second embodiment of the present invention will be described below with reference to FIG. 3.

First, if the magnitude of power supplied by the AC power source 20a is lower than 50% of the total forward voltage of the LED module 30b in a positive half cycle of the power, the power is rectified by the diode pair BD0 of the rectification unit 40b and then input to the operation control voltage generation unit 50b and the second switch 66b of the operating current control unit 60b.

Furthermore, the first and second switches 62b and 66b operate in response to the voltage generated by the second input current input to the operation control voltage generation unit 50b, thereby entering an ON state. The second input current input to the second switch 66b passes through the second switch 66b.

The second input current may function as an auxiliary current that improves a power factor.

Furthermore, the second input current passing through the second switch 66b is changed into voltage through a resistor Rsen2 connected to the second switch 66b. The changed voltage passes through a resistor RS2, and operates the second current control unit 68b connected to the second switch 66b. That is, the changed voltage operates the gate of the second current control unit 68b.

The change voltage that operates the second current control unit 68b may be a partial voltage that is determined by the resistor RS2 and a resistor ROFF2. Accordingly, the second input current flowing through the second switch 66b can be regularly controlled because the magnitude of the voltage at the gate of the second switch 66b is controlled by the operation of the second current control unit 68b.

When the magnitude of the voltage supplied by the AC power source 20b rises and is higher than the total forward voltage of the LED module 30b in the positive half cycle, the first input current passes through the LED of the LED pair D1 of the LED array 30b in the forward direction and the rectification unit 40b (that is, the diode pair BD1 of the rectification unit 40a), and is then input to the first switch 62b.

In this case, the first input current input to the first switch 62b passes through the first switch 62b because the first switch 62b enters an ON state in response to the voltage generated by the operation control voltage generation unit 50b.

The first input current may function as a main current that operates the LEDs of the LED pairs D1 and D2 of the LED array 30b that are disposed in the forward direction.

Furthermore, the first input current is changed into a voltage through a resistor Rsen1 connected in series to the first switch 62b. The changed voltage operates the first current control unit 64b connected to the first switch 62b through a resistor RS1. That is, the changed voltage operates the gate of the first current control unit 64b.

The changed voltage that operates the first current control unit 64b may be a partial voltage that is determined by the resistor RS1 and a resistor RGS1. Accordingly, the first input current flowing through the first switch 62b can be regularly controlled because the magnitude of voltage at the gate of the first switch 62b is controlled by the operation of the first current control unit 64b.

Furthermore, when the first current control unit 64b operates, voltage of the resistor Rsen1 connected in series to the first switch 62b operates the second current control unit 68b through the resistor Roff2 (that is, the voltage of the resistor Rsen1 turns on the second current control unit 68b), thereby turning off the second switch 66b. Accordingly, the second input current input to the second switch 66b can be prevented from flowing through the second switch 66a.

In accordance with the apparatus for controlling the operation of LEDs 10b according to the second embodiment of the present invention, the operation control voltage generation unit 50b for generating a voltage for the operation of the operating current control unit 60b includes the resistor 52b and the Zener diode 54b, and the second current control unit 68b performs the constant current control of the second input current input to the second switch 66b through the diode pair BD0 of the rectification unit 40b and also performed an operation of turning off the second switch 66b. Accordingly, the configuration of the corresponding circuit can be simplified and the cost required to construct the circuit can be reduced, as compared with a prior art.

Furthermore, although in FIG. 3 the apparatus for controlling the operation of LEDs 10b according to the second embodiment of the present invention has been illustrated as having a 2-stage structure configured to include the LED array 30b including the two LED pairs 32b and 34b connected in parallel in a backward direction, the rectification unit 40b including three diode pairs, and the operating current control unit 60b including two switches and two current control units, the apparatus for controlling the operation of LEDs 10b according to the second embodiment of the present invention is not limited thereto. For example, the apparatus for controlling the operation of LEDs 10b may have a 3- or 4-stage structure by increasing the number of LED pairs connected in parallel in the backward direction and included in the LED array 30b, the number of diode pairs included in the rectification unit 40b, and the number of switches and the number of current control units included in the operating current control unit 60b.

Figure 4:
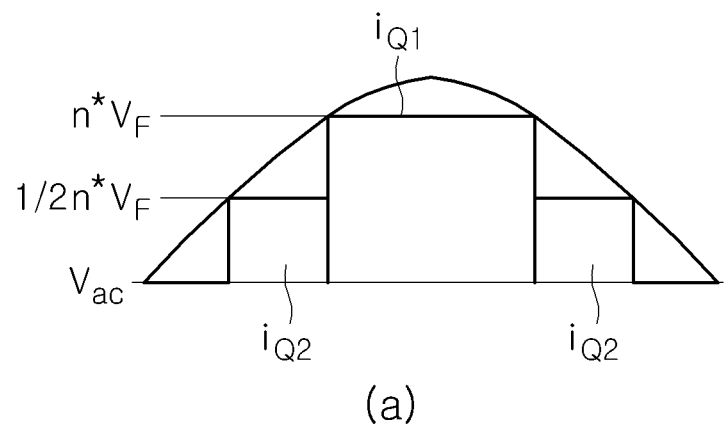
FIG. 4 is a reference diagram illustrating a current-voltage waveform according to a method of operating the apparatus for controlling the operation of LEDs according to the first and second embodiments of the present invention.
Figure 4:
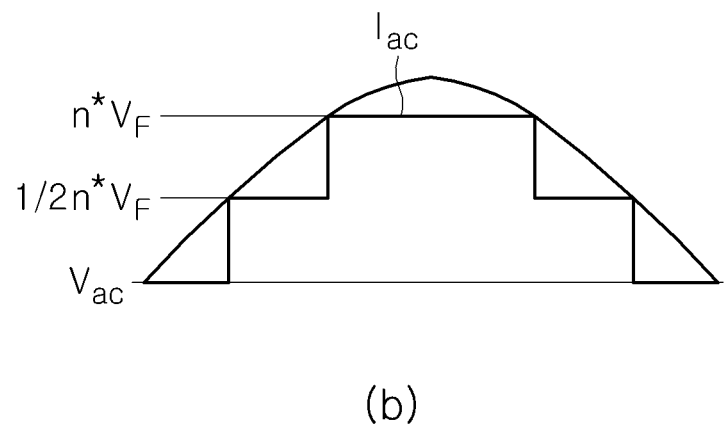

FIG. 4 is a reference diagram illustrating a current-voltage waveform according to a method of operating the apparatus for controlling the operation of LEDs according to the first and second embodiments of the present invention.

As shown in FIG. 4(a), when the magnitude of AC voltage having a positive value supplied by the AC power source 20a is 50% (0.5*n*VF) of the total forward voltage of the LED array 20b, the second input current iQ2 on which constant current control has been performed by the operation of the second switch 66a and the second current control unit 68a may be supplied to the LED array 20a. When the magnitude of the AC voltage is larger than the amount (n*VF) of the total forward voltage of the LED array 20b, the first input current iQ1 on which constant current control has been performed by the operations of the first switch 62a and the first current control unit 64a may be supplied to the LED array 20a. When the first input current iQ1 on which constant current control has been performed is supplied to the LED array 20a, the second switch 66a may enter an OFF state in response to the operation of the second current control unit 68a.

Accordingly, an input current Iac that operates the LED array 30a after being supplied by the AC power source 20a has a 2-level structure by the vertical adding-up of the first input current iQ1 and the second input current iQ2 (that is, a 2-stage structure). Accordingly, as shown in FIG. 4(b), the input current Iac may maintain a constant current even when the input voltage fluctuates, and may have a sine wave shape that is capable of suppressing harmonics and improving a power factor.

Furthermore, the ratio of the magnitude of the positive voltage (that is, 50% of the magnitude of the total forward voltage of the LED array 20a) supplied by the AC power source 20a, which is proposed as the condition in which the second input current is supplied to the LED array 20a, is only an embodiment in which an input current is made to have the 2-level structure through the vertical adding-up of the first input current and the second input current. Accordingly, the ratio is not limited to 50%, but may be adjusted (e.g., to 40% or 60%) if necessary.

Furthermore, in the apparatus for controlling the operation of LEDs 10b according to the second embodiment of the present invention, the input current for operating the LED array 30b may maintain a constant current control state through the vertical adding-up of the first input current iQ1 and the second input current iQ2 even when input voltage supplied by the AC power source 20b fluctuates, and may have a sine wave shape that is capable of suppressing harmonics and improving a power factor.

Figure 5:
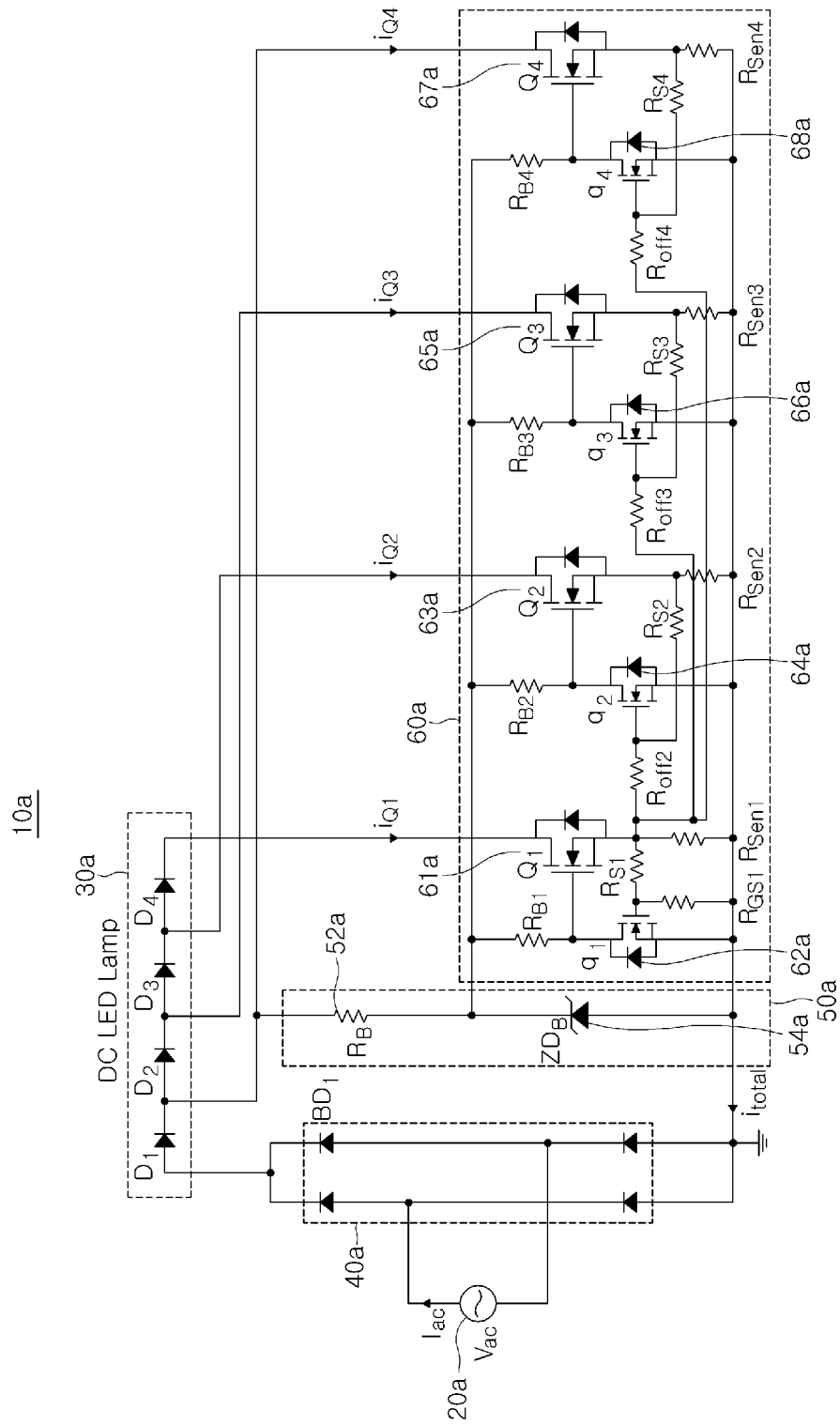
FIG. 5 is a circuit diagram of an apparatus for controlling the operation of LEDs according to a third embodiment of the present invention.

FIG. 5 is a circuit diagram of an apparatus for controlling the operation of LEDs according to a third embodiment of the present invention.

As shown in FIG. 5, the apparatus 10a for controlling the operation of LEDs according to the third embodiment of the present invention includes an AC power source 20a, an LED array 30a, a rectification unit 40a, an operation control voltage generation unit 50a, and an operating current control unit 60a.

The AC power source 20a supplies power for the operation of the LED array 30a, and the input side of the LED array 30a is connected to the output side of the AC power source 20a.

The LED array 30a includes a plurality of LEDs connected in series, and each of the LEDs may be a DC-operated LED that is operated by DC power.

The rectification unit 40a is connected between the output side of the AC power source 20a and the input side of the LED array 30a. In greater detail, the output side of the rectification unit 40a is connected to the input side of the LED array 30a, and the input side of the rectification unit 40a is connected to the operation control voltage generation unit 50a and the operating current control unit 60a. The rectification unit 40a rectifies the power supplied by the AC power source 20a, and outputs the rectified power to the LED array 30a.

The rectification unit 40a may include a plurality of diode pairs that are connected in a forward direction.

The operation control voltage generation unit 50a has one side connected to the LED array 30a and the other side connected to the rectification unit 40a. The operation control voltage generation unit 50a receives a current passing through a specific LED (e.g., D1 of FIG. 5) of the LED array 30a, and generates a voltage for the operation of the operating current control unit 60a using the received current.

The operation control voltage generation unit 50a may include a resistor RB configured to have one side connected to the LED array 30a, and a Zener diode ZDB connected in series to the other side of the resistor RB.

The operating current control unit 60a has one side connected to the operation control voltage generation unit 50a and the LED array 30a, and the other side connected to the input side of the rectification unit 40a. The operating current control unit 60a operates in response to the voltage generated by the operation control voltage generation unit 50a, and performs the constant current control of a plurality of input currents received through at least one LED of the LED array 30a.

The operating current control unit 60a includes a first switch 61a configured to have one side connected to the output side of the LED array 30a and to receive a first input current iQ1 received from the output side of the LED array 30a, the first input current iQ1 belonging to the plurality of input currents, a first current control unit 62a connected to the first switch 61a and configured to perform the constant current control of the first input current, a second switch 63a configured to have one side connected to the LED array 30a and to receive a second input current iQ2 passing through some of the LEDs (e.g., D1 to D3) of the LED array 30a, the second input current iQ2 belonging to the plurality of input currents, a second current control unit 64a connected to the second switch 63a and configured to perform the constant current control of the second input current, a third switch 65a configured to have one side connected to the LED array 30a and to receive a third input current iQ3 passing through some LEDs (e.g., D1 and D2) of the LED array 30a, the third input current iQ3 belonging to the plurality of input currents, a third current control unit 66a connected to the third switch 65a and configured to perform constant current control the third input current, a fourth switch 67a connected to have one side connected to the LED array 30a and to receive a fourth input current iQ4 passing through a specific LED (e.g., D1) of the LED array 30a, the fourth input current iQ4 belonging to the plurality of input currents, and a fourth current control unit 68a connected to the fourth switch 67a and configured to perform the constant current control of the fourth input current.

When the first input current is input to the first switch 61a, the first current control unit 62a may turn off the second switch 63a, the third switch 65a, and the fourth switch 67a.

Furthermore, each of the first switch 61a, the second switch 63a, the third switch 65a and the fourth switch 67a may be a MOSFET or a transistor, the first current control unit 62a may be a MOSFET, a transistor, or a shunt regulator, and each of the second current control unit 64a, the third current control unit 66a, and the fourth current control unit 68a may be a MOSFET or a transistor.

The operation of the apparatus 10a for controlling the operation of LEDs according to the third embodiment of the present invention will be described below with reference to FIG. 5.

First, when a positive voltage supplied by the AC power source 20a rises and becomes higher than 25% of the total forward voltage of the LED array 20a, the fourth input current passes through a specific LED (e.g., D1) of the LED array 30a, and the fourth input current is input to the operation control voltage generation unit 50a and the fourth switch 67a of the operating current control unit 60a.

Furthermore, the first switch 61a, the second switch 63a, the third switch 65a, and the fourth switch 67a are operated in response to the fourth input current input to the operation control voltage generation unit 50a, thereby entering an ON state. The fourth input current input to the fourth switch 67a passes through the fourth switch 67a.

The fourth input current may function as an auxiliary current that improves a power factor, and may also function to minimize a flicker phenomenon by operating a specific LED (e.g., D1) of the LED array 30a.

Furthermore, the fourth input current passing through the fourth switch 67a is changed into a voltage through a resistor Rsen4 connected to the fourth switch 67a. The changed voltage passes through a resistor RS4, and operates the fourth current control unit 68a connected to the fourth switch 67a. That is, the changed voltage operates the gate of the fourth current control unit 68a.

The changed voltage that operates the fourth current control unit 68a may be a partial voltage that is determined by the resistor RS4 and a resistor ROFF4. A current flowing through the fourth switch 67a may be subjected to constant current control because the magnitude of voltage at the gate of the fourth switch 67a is controlled by the operation of the fourth current control unit 68a.

Next, when voltage supplied by the AC power source 20a is higher than 50% of the total forward voltage of the LED array 30a, the third input current passes through some LEDs (e.g., D1 and D2) of the LED array 30a and is then input to the third switch 65a.

In this case, the third input current input to the third switch 65a passes through the third switch 65a because the third switch 65a enters an ON state in response to the voltage generated by the operation control voltage generation unit 50a. Accordingly, the third input current may function as an auxiliary current that improves a power factor, and may also function to minimize a flicker phenomenon by operating some LEDs (e.g., D1 and D2) of the LED array 30a.

Furthermore, the third input current is changed into a voltage through a resistor Rsen3 connected in series to the third switch 65a. The changed voltage operates the third current control unit 66a connected to the third switch 65a through a resistor RS3. That is, the changed voltage operates the gate of the third current control unit 66a.

The changed voltage that operates the third current control unit 66a may be a partial voltage that is determined by the resistor RS3 and a resistor Roff3. Accordingly, a current flowing through the third switch 66a can be regularly controlled because the magnitude of voltage at the gate of the third switch 66a is controlled by the operation of the third current control unit 66a.

Next, when the voltage supplied by the AC power source 20a is higher than 75% of the total forward voltage of the LED array 30a, the second input current is input to the second switch 63a through some LEDs (e.g., D1 to D3) of the LED array 30a.

In this case, the second input current input to the second switch 63a passes through the second switch 63a because the second switch 63a enters an ON state in response to the voltage generated by the operation control voltage generation unit 50a. Accordingly, the second input current may function as an auxiliary current that improves a power factor, and may also function to minimize a flicker phenomenon by operating some LEDs (e.g., D1 to D3) of the LED array 30a.

Furthermore, the second input current is changed into voltage through a resistor Rsen2 connected in series to the second switch 63a. The changed voltage operates the second current control unit 64a connected to the second switch 63a through a resistor RS2. That is, the changed voltage operates the gate of the second current control unit 64a.

The changed voltage that operates the second current control unit 64a may be a partial voltage that is determined by the resistor Rs2 and a resistor Roff2. Accordingly, a current flowing through the second switch 63a can be regularly controlled because the magnitude of the voltage at the gate of the second switch 63a is controlled by the operation of the second current control unit 64a.

Next, when the voltage supplied by the AC power source 20a is higher than the total forward voltage of the LED module 30a, the first input current passes through the rectification unit 40a and the output side of the LED module 30a (that is, through the LED D1 to the LED D4 of the LED module 30a), and the first input current is then input to the first switch 61a.

In this case, the first input current input to the first switch 61a passes through the first switch 61a because the first switch 61a enters an ON state in response to the voltage generated by the operation control voltage generation unit 50a.

In this case, the first input current may function as a main current that operates the LED array 30a.

Furthermore, the first input current is changed into a voltage through a resistor Rsen1 connected in series to the first switch 61a. The changed voltage operates the first current control unit 62a connected to the first switch 61a through a resistor Rs1.

The changed voltage that operates the first current control unit 64a may be a partial voltage that is determined by the resistor Rs1 and a resistor RGS1. Accordingly, a current flowing through the first switch 61a can be regularly controlled because the magnitude of voltage at the gate of the first switch 61a is controlled by the operation of the first current control unit 62a.

Furthermore, when the first current control unit 62a operates, the voltage of the resistor Rsen1 connected in series to the first switch 61a operates the second current control unit 64a, the third current control unit 66a, and the fourth current control unit 68a through the resistors Roff2, Roff3, and Roff4 (that is, the voltage of the resistor Rsen1 turns on the second current control unit 64a, the third current control unit 66a, and the fourth current control unit 68a), thereby turning off. Accordingly, the second input current, the third input current, and the fourth input current can be prevented from flowing through the second switch 63a, the third switch 65a, and the fourth switch 67a.

That is, the second current control unit 64a, the third current control unit 66a and the fourth current control unit 68a may perform a dual function of operating in an active region and then performing the constant current control of the second input current, the third input current and the fourth input current, respectively, before the first input current is input to the first switch 61a, and of entering an ON state and then turning off the second switch 63a, the third switch 65a and the fourth switch 67a when the first input current is input to the first switch 61a.

Accordingly, in accordance with the apparatus 10a for controlling the operation of LEDs according to the third embodiment of the present invention, the operation control voltage generation unit 50a for generating the voltage for the operation of the operating current control unit 60a is formed of the resistor 52a and the Zener diode 54a. Furthermore, the second current control unit 64a, the third current control unit 66a, and the fourth current control unit 68a perform the constant current control of the second input current, the third input current and the fourth input current, and an operation of turning off the second switch 63a, the third switch 65a and the fourth switch 67a. Accordingly, the configuration of the corresponding circuit can be simplified and the cost required to construct the circuit can be reduced, as compared with a prior art.

Figure 6:
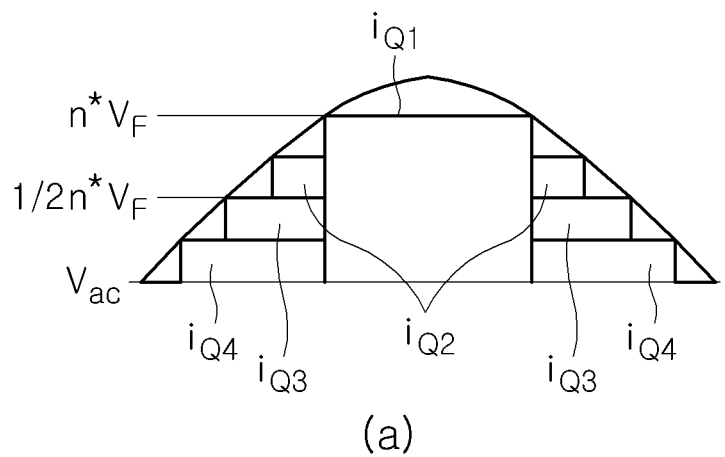
FIG. 6 is a reference diagram illustrating a current-voltage waveform according to a method of operating the apparatus for controlling the operation of LEDs according to the third embodiment of the present invention.
Figure 6:
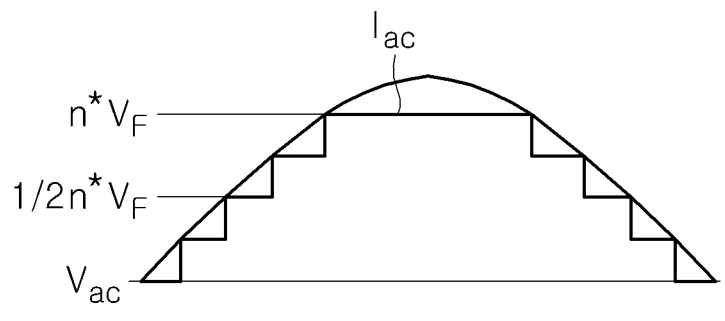

FIG. 6 is a reference diagram illustrating a current-voltage waveform according to a method of operating the apparatus for controlling the operation of LEDs according to the third embodiment of the present invention.

As shown in FIG. 6(a), when the magnitude of positive voltage supplied by the AC power source 20a is higher than 25% of the total forward voltage of the LED array 20a, the fourth input current iQ4 on which constant current control has been performed by the operations of the fourth switch 67a and the fourth current control unit 68a may be supplied to the LED array 20a. When the magnitude of the positive voltage is higher than 50% of the total forward voltage of the LED array 20a, the third input current iQ3 on which constant current control has been performed by the operations of the third switch 65a and the third current control unit 66a may be supplied to the LED array 20a. When the magnitude of the positive voltage is higher than 75% of the magnitude of the total forward voltage of the LED array 20a, the second input current iQ2 on which constant current control has been performed by the operations of the second switch 63a and the second current control unit 64a may be supplied to the LED array 20a. When the magnitude of the positive voltage is higher than the total forward voltage of the LED array 20a, the first input current iQ1 on which constant current control has been performed by the operations of the first switch 61a and the first current control unit 62a may be supplied to the LED array 20a.

Furthermore, as described above, the ratios (that is, 25%, 50%, and 75% of the total forward voltage of the LED array 30a) of the magnitude of positive voltage supplied by the AC power source 20a, which are proposed as the conditions in which the second input current, the third input current and the fourth input current are supplied to the LED array 20a, are only embodiments in which the ratios are made to have a 4-level structure through the vertical and horizontal adding-up of the first input current, the second input current, the third input current, and the fourth input current. The ratios are not limited to 25%, 50%, and 75%, but may be adjusted (e.g., to 20%, 45%, and 70%) if necessary.

Furthermore, if the first input current iQ1 that has been subjected to constant current control is supplied to the LED array 20a, the second switch 63a, the third switch 65a, and the fourth switch 67a may enter an OFF state in response to the operation of the first current control unit 62a. FIG. 6 shows that regions in which the second switch 63a, the third switch 65a, and the fourth switch 67a are operated are wider in the order of the fourth switch 67a, the third switch 65a, and the second switch 63a.

Accordingly, the input current Iac that operates the LED array 30a after being supplied by the AC power source 20a has a 4-level structure (that is, a 4-stage structure) through the vertical and horizontal adding-up of the first input current, the second input current, the third input current, and the fourth input current. Accordingly, as shown in FIG. 6(b), the input current Iac may maintain a constant current even when an input voltage fluctuates, and may have a sine wave shape that is capable of suppressing harmonics and improving the power factor.

Figure 7:
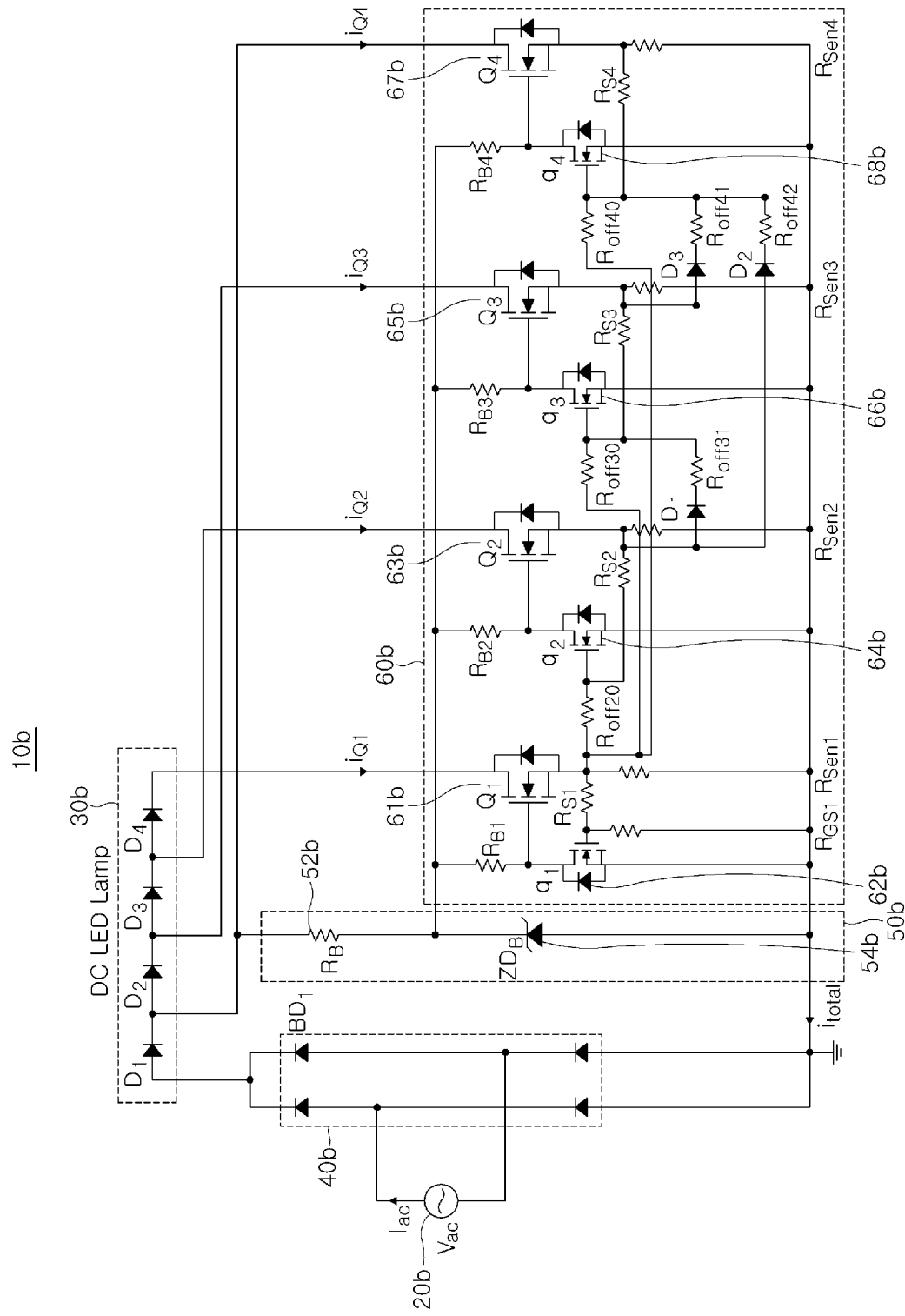
FIG. 7 is a circuit diagram of an apparatus for controlling the operation of LEDs according to a fourth embodiment of the present invention.

FIG. 7 is a circuit diagram of an apparatus for controlling the operation of LEDs according to a fourth embodiment of the present invention.

As shown in FIG. 7, the apparatus for controlling the operation of LEDs 10b according to the fourth embodiment of the present invention includes an AC power source 20b, an LED array 30b, a rectification unit 40b, an operation control voltage generation unit 50b, and an operating current control unit 60b.

The AC power source 20b supplies power for the operation of the LED array 30b, and the input side of the LED array 30b is connected to the output side of the AC power source 20b.

The LED array 30b includes a plurality of LEDs connected in series, and each of the LEDs may be a DC-operated LED that is operated by DC power.

The rectification unit 40b is connected between the output side of the AC power source 20b and the input side of the LED array 30b. More particularly, the output side of the rectification unit 40b is connected to the input side of the LED array 30b, and the input side of the rectification unit 40b is connected to the operation control voltage generation unit 50b and the operating current control unit 60b. The rectification unit 40b rectifies power supplied by the AC power source 20b, and outputs the rectified power to the LED array 30b.

The rectification unit 40b may include a plurality of diode pairs connected in a forward direction.

The operation control voltage generation unit 50b has one side connected to the LED array 30b and the other side connected to the rectification unit 40b. The operation control voltage generation unit 50b receives a current that passes through a specific LED (D1 of FIG. 7) of the LED array 30b, and generates a voltage for the operation of the operating current control unit 60b using the received current.

The operation control voltage generation unit 50b may include a resistor RB configured to have one side connected to the LED array 30b, and a Zener diode ZDB connected in series to the other side of the resistor RB.

The operating current control unit 60b has one side connected to the operation control voltage generation unit 50b and the LED array 30b, and the other side connected to the input side of the rectification unit 40b. The operating current control unit 60b operates in response to the voltage generated by the operation control voltage generation unit 50b, and performs the constant current control of a plurality of input currents received through at least one LED of the LED array 30b.

The operating current control unit 60b includes a first switch 61b configured to have one side connected to the output side of the LED array 30b and to receive a first input current iQ1 from the output side of the LED array 30b, the first input current iQ1 belonging to the plurality of input currents, a first current control unit 62b connected to the first switch 61b and configured to perform the constant current control of the first input current, a second switch 63b configured to have one side connected to the LED array 30b and to receive a second input current iQ2 that passes through some LEDs (e.g., D1 to D3) of the LED array 30b, the second input current iQ2 belonging to the plurality of input currents, a second current control unit 64b connected to the second switch 63b and configured to perform the constant current control of the second input current, a third switch 65b configured to have one side connected to the LED array 30b and to receive a third input current iQ3 that passes through some LEDs (e.g., D1 and D2) of the LED array 30b, the third input current iQ3 belonging to the plurality of input currents, a third current control unit 66b connected to the third switch 65b and configured to perform the constant current control of the third input current, a fourth switch 67b configured to have one side connected to the LED array 30b and to receive a fourth input current iQ4 that passes through a specific LED (e.g., D1) of the LED array 30b, the fourth input current iQ4 belonging to the plurality of input currents, and a fourth current control unit 68b connected to the fourth switch 67b and configured to perform the constant current control of the fourth input current.

When the first input current is input to the first switch 61b, the first current control unit 62b may operate and turn off the second switch 63b, the third switch 65b and the fourth switch 67b. When the second input current is input to the second switch 63b, the second current control unit 64b may operate and turn off the third switch 65b and the fourth switch 67b. When the third input current is input to the third switch 65b, the third current control unit 66b may operate and turn off the fourth switch 67b.

Furthermore, each of the first switch 61b, the second switch 63b, the third switch 65b, and the fourth switch 67b may be a MOSFET or a transistor, the first current control unit 62b may be a MOSFET, a transistor or a shunt regulator, and each of the second current control unit 64b, the third current control unit 66b and the fourth current control unit 68b may be a MOSFET or a transistor.

The operation of the apparatus for controlling the operation of LEDs 10b according to the fourth embodiment of the present invention will be described below with reference to FIG. 7.

First, when the positive voltage supplied by the AC power source 20b rises and becomes higher than 25% of the total forward voltage of the LED array 20b, the fourth input current passes through a specific LED (e.g., D1) of the LED array 30b, and the fourth input current is input to the operation control voltage generation unit 50b and the fourth switch 67b of the operating current control unit 60b.

Furthermore, the first switch 61b, the second switch 63b, the third switch 65b and the fourth switch 67b operate in response to the voltage generated by the fourth input current input to the operation control voltage generation unit 50b, thereby entering an ON state. The fourth input current input to the fourth switch 67b passes through the fourth switch 67b.

In this case, the fourth input current may function as an auxiliary current that improves a power factor, and may also function to minimize a flicker phenomenon by operating a specific LED (e.g., D1) of the LED array 30b.

The fourth input current passing through the fourth switch 67b is changed into a voltage through a resistor Rsen4 connected to the fourth switch 67b. The changed voltage passes through a resistor RS4, and then operates the fourth current control unit 68b connected to the fourth switch 67b. That is, the changed voltage operates the gate of the fourth current control unit 68b.

The changed voltage that operates the fourth current control unit 68b may be a partial voltage that is determined by the resistor RS4 and a resistor ROFF40. Accordingly, a current flowing through the fourth switch 67b can be subjected to constant current control because the magnitude of the voltage at the gate of the fourth switch 67b is controlled by the operation of the fourth current control unit 68b.

Next, when the voltage supplied by the AC power source 20b is higher than 50% of the total forward voltage of the LED array 30b, the third input current is input to the third switch 65b through some LEDs (e.g., D1 and D2) of the LED array 30b.

In this case, the third input current input to the third switch 65b passes through the third switch 65b because the third switch 65b enters an ON state in response to the voltage generated by the operation control voltage generation unit 50b. The third input current may function as an auxiliary current that improves a power factor, and may also function to minimize a flicker phenomenon by operating some LEDs (e.g., D1 and D2) of the LED array 30b.

Furthermore, the third input current is changed into a voltage through a resistor Rsen3 connected in series to the third switch 65b. The changed voltage operates the third current control unit 66b connected to the third switch 65b through a resistor RS3. That is, the changed voltage operates the gate of the third current control unit 66b.

The changed voltage that operates the third current control unit 66b may be a partial voltage that is determined by the resistor RS3 and a resistor Roff30. Accordingly, a current flowing through the third switch 66b can be regularly controlled because the magnitude of the voltage at the gate of the third switch 66b is controlled by the operation of the third current control unit 66b.

Furthermore, the voltage flowing through the resistor Rsen3 operates the fourth current control unit 68b through a diode D3 and a resistor Roff41 connected to the resistor Rsen3 (that is, turns on the fourth current control unit 68b), thereby turning off the fourth switch 67b. Accordingly, the fourth input current does not flow through the fourth switch 67b.

When the voltage supplied by the AC power source 20b is higher than 75% of the total forward voltage of the LED array 30b, the second input current is input to the second switch 63b through some LEDs (e.g., D1 to D3) of the LED module 30b.

In this case, the second input current input to the second switch 63a passes through the second switch 63b because the second switch 63b enters an ON state in response to the voltage generated by the operation control voltage generation unit 50b. Accordingly, the second input current may function as an auxiliary current that improves a power factor, and may also function to minimize a flicker phenomenon by operating some LEDs (e.g., D1 to D3) of the LED array 30b.

Furthermore, the second input current is changed into a voltage through a resistor Rsen2 connected in series to the second switch 63b. The changed voltage operates the second current control unit 64b connected to the second switch 63b through a resistor Rs2. That is, the changed voltage operates the gate of the second current control unit 64b.

The changed voltage that operates the second current control unit 64b may be a partial voltage that is determined by the resistor Rs2 and a resistor Roff20. A current flowing through the second switch 63b can be regularly controlled because the magnitude of the voltage at the gate of the second switch 63b is controlled by the operation of the second current control unit 64b.

Furthermore, the voltage flowing through the resistor Rsen2 operates the third current control unit 66b through a diode D1 and a resistor Roff31 connected to the resistor Rsen2 (that is, the voltage turns on the third current control unit 66b), thereby turning off the third switch 65b. Accordingly, the third input current can be prevented from flowing through the third switch 65b. Furthermore, the voltage flowing through the resistor Rsen2 operates the fourth current control unit 68b through a diode D2 and a resistor Roff42 connected to the resistor Rsen2 (that is, turns on the fourth current control unit 68b), thereby turning off the fourth switch 67b. Accordingly, the fourth input current can be prevented from flowing through the fourth switch 67b.

When the voltage supplied by the AC power source 20b becomes higher than the total forward voltage of the LED module 30b, the first input current passes through the rectification unit 40b and is then input to the first switch 61b through the output side (that is, the LED D1 to the LED D4 of the LED module 30b) of the LED module 30b.

In this case, the first input current input to the first switch 61b passes through the first switch 61b because the first switch 61b enters an ON state in response to the voltage generated by the operation control voltage generation unit 50b.

In this case, the first input current may function as a main current that operates the LED array 30b.

Furthermore, the first input current is changed into voltage through a resistor Rsen1 connected in series to the first switch 61b. The changed voltage operates the first current control unit 62b connected to the first switch 61b through a resistor Rs1. That is, the changed voltage operates the gate of the first current control unit 62b.

The changed voltage that operates the first current control unit 62b may be a partial voltage that is determined by the resistor Rs1 and a resistor RGS1. Accordingly, a current flowing through the first switch 61b can be regularly controlled because the magnitude of the voltage at the gate of the first switch 61b is controlled by the operation of the first current control unit 62b.

Furthermore, when the first current control unit 62b operates, a voltage of the resistor Rsen1 connected in series to the first switch 61b operates the second current control unit 64b, the third current control unit 66b and the fourth current control unit 68b through the resistors Roff20, Roff30, and Roff40 (that is, the voltage of the resistor Rsen1 turns on the second current control unit 64b, the third current control unit 66b, and the fourth current control unit 68b), thereby turning off the second switch 63b, the third switch 65b and the fourth switch 67b. Accordingly, the second input current, the third input current, and the fourth input current can be prevented from flowing through the second switch 63b, the third switch 65b, and the fourth switch 67b.

That is, the fourth current control unit 68b may perform a dual function of operating in an active region and then performing the constant current control of the fourth input current before the third input current is input to the third switch 65b and of entering an ON state and then turning off the fourth switch 67b when the third input current is input to the third switch 67b. Furthermore, the third current control unit 66b may perform a dual function of operating in an active region and then performing the constant current control of the third input current before the second input current is input to the second switch 63b and of entering an ON state and then turning off the third switch 67b when the second input current is input to the second switch 63b. Furthermore, the second current control unit 64b may perform a dual function of operating in an active region and then performing the constant current control of the first input current before the second input current is input to the second switch 63b and of entering an ON state and then turning off the second switch 63b when the first input current is input to the first switch 63b.

Accordingly, in accordance with the apparatus for controlling the operation of LEDs 10b according to the fourth embodiment of the present invention, the operation control voltage generation unit 50b for generating voltage for the operation of the operating current control unit 60b includes the resistor 52b and the Zener diode 54b, and the second current control unit 64b, the third current control unit 66b, and the fourth current control unit 68b perform the constant current control of the second input current, the third input current, and the fourth input current, respectively, and an operation of turning off the second switch 63b, the third switch 65b, and the fourth switch 67b. Accordingly, the configuration of the corresponding circuit can be simplified and the cost required to construct the circuit can be reduced, as compared with the prior art.

Figure 8:
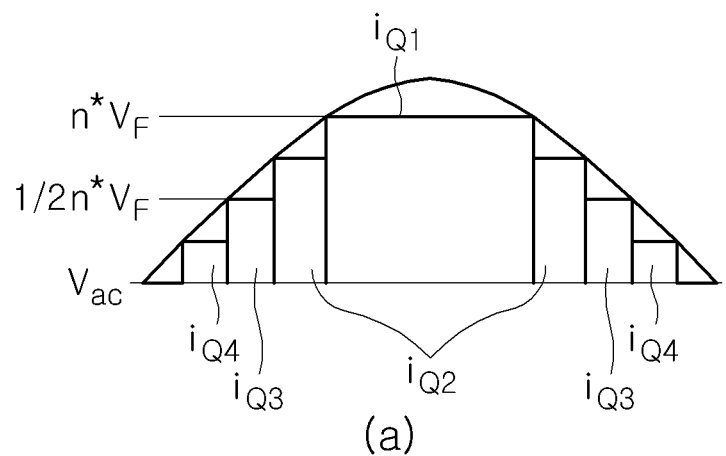
FIG. 8 is a reference diagram illustrating a current-voltage waveform according to a method of operating the apparatus for controlling the operation of LEDs according to the fourth embodiment of the present invention.
Figure 8:
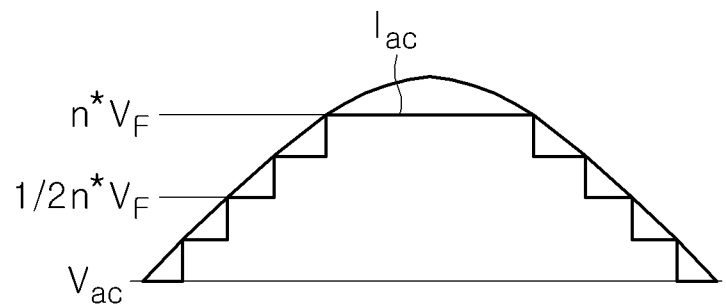

FIG. 8 is a reference diagram illustrating a current-voltage waveform according to a method of operating the apparatus for controlling the operation of LEDs according to the fourth embodiment of the present invention.

As shown in FIG. 8(a), when the magnitude of positive voltage supplied by the AC power source 20b is higher than 25% of the total forward voltage of the LED array 30b, the fourth input current iQ4 on which on which constant current control has been performed by the operations of the fourth switch 67a and the fourth current control unit 68b may be supplied to the LED array 30b. When the magnitude of the positive voltage becomes 50% of the total forward voltage of the LED array 30b, the third input current iQ3 on which constant current control has been performed by the operations of the third switch 65b and the third current control unit 66b may be supplied to the LED array 30b. When the magnitude of the positive voltage is higher than 75% of the total forward voltage of the LED array 30b, the second input current iQ2 on which constant current control has been performed by the operations of the second switch 63b and the second current control unit 64b may be supplied to the LED array 30b. When the magnitude of the positive voltage becomes higher than the total forward voltage of the LED array 30b, the first input current iQ1 on which constant current control has been performed by the operations of the first switch 61b and the first current control unit 62b may be supplied to the LED array 30b.

Furthermore, when the third input current iQ3 is supplied to the LED array 30b through the third switch 65b, the fourth switch 68b may enter an OFF state in response to the operation of the third current control unit 66b. When the second input current iQ2 is supplied to the LED array 30b through the second switch 63b, the third switch 66b and the fourth switch 68b may enter an OFF state in response to the operation of the second current control unit 64b. When the first input current iQ1 is supplied to the LED array 30b through the first switch 61b, the second switch 63b, the third switch 65b, and the fourth switch 67b may enter an OFF state in response to the operation of the first current control unit 62b. From FIG. 8, it can be seen that all of the first switch 61b, the second switch 63b, the third switch 65b, and the fourth switch 67b partially operate in specific voltages.

Accordingly, the input current Iac that operates the LED array 30b after being supplied by the AC power source 20b has a 4-level structure (that is, a 4-stage structure) through the vertical adding-up of the first input current, the second input current, the third input current, and the fourth input current. Accordingly, as shown in FIG. 9(b), the input current Iac can maintain a constant current even when the input voltage fluctuates, and may have a sine wave shape that is capable of suppressing harmonics and improving a power factor.

Figure 9:
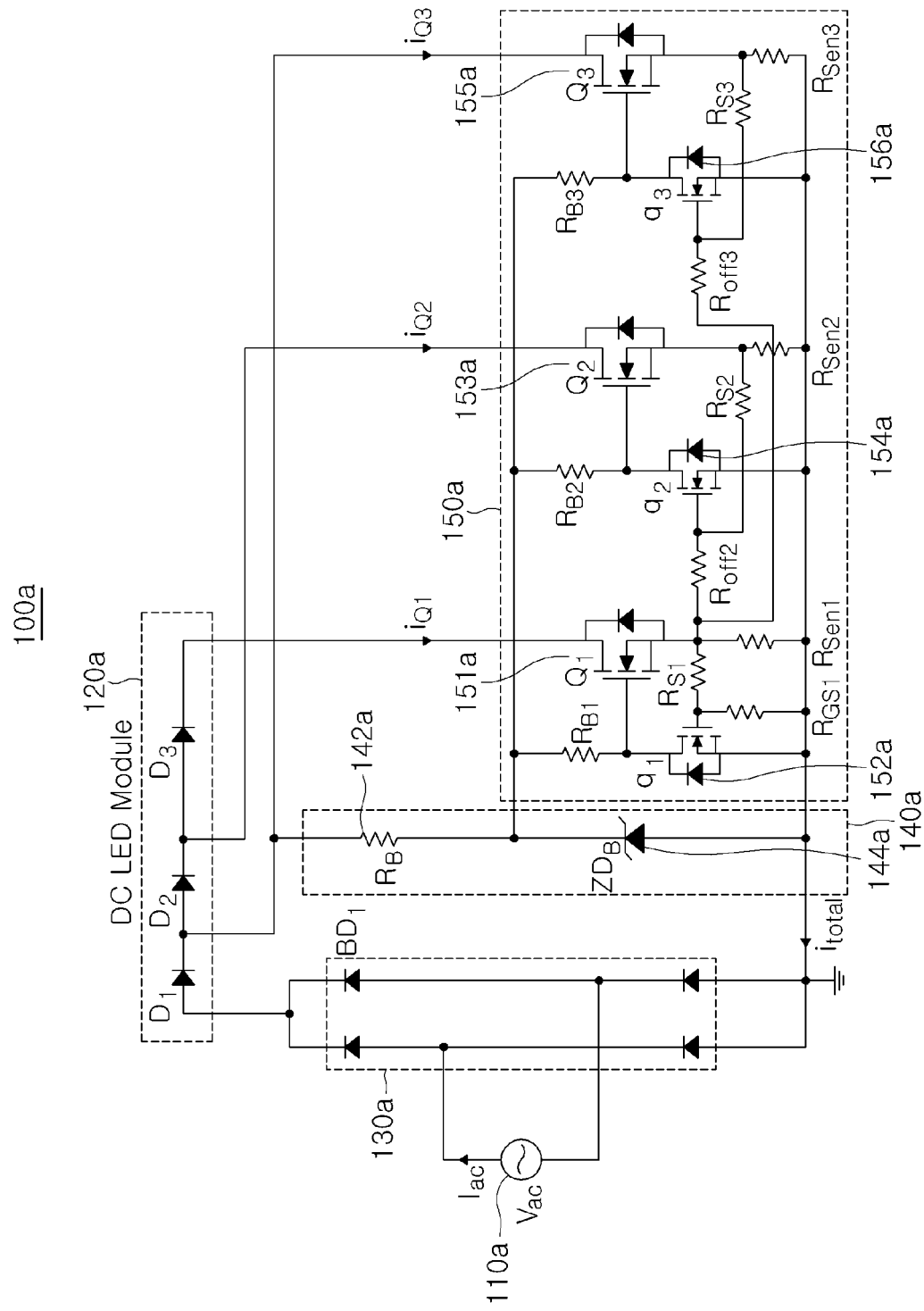
FIG. 9 is a circuit diagram of an apparatus for controlling the operation of LEDs according to a fifth embodiment of the present invention.
Figure 10:
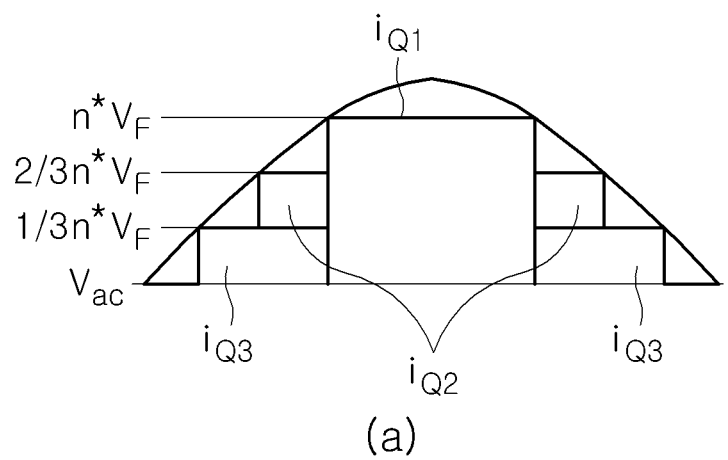
FIG. 10 is a reference diagram illustrating a current-voltage waveform according to a method of operating the apparatus for controlling the operation of LEDs according to the fifth embodiment of the present invention.
Figure 10:
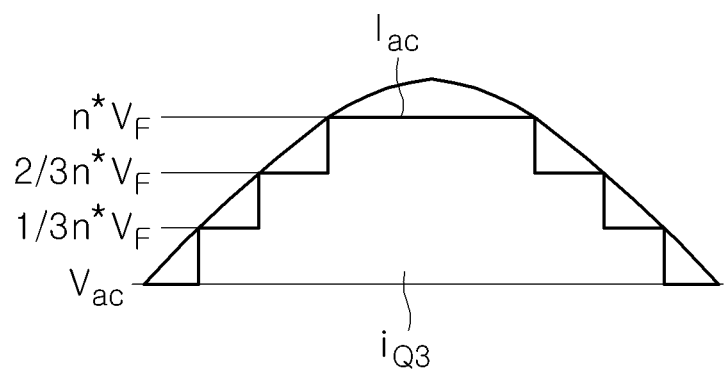

FIG. 9 is a circuit diagram of an apparatus for controlling the operation of LEDs according to a fifth embodiment of the present invention, and FIG. 10 is a reference diagram illustrating a current-voltage waveform according to a method of operating the apparatus for controlling the operation of LEDs according to the fifth embodiment of the present invention.

As shown in FIG. 9, the apparatus for controlling the operation of LEDs 100a according to the fifth embodiment of the present invention includes an AC power source 110a, an LED array 120a, a rectification unit 130a, an operation control voltage generation unit 140a, and an operating current control unit 150a.

In the apparatus for controlling the operation of LEDs 100a according to the fifth embodiment of the present invention, a plurality of input currents passing through one or more LEDs of the LED array 120a includes a first input current, a second input current, and a third input current. In order for an input current Iac to have a 3-level structure (that is, a 3-stage structure) through the horizontal and vertical adding-up of the first input current, the second input current, and the third input current, the operating current control unit 150a includes a first switch 151a, a first current control unit 152a, a second switch 153a, a second current control unit 154a, a third switch 155a, and a third current control unit 156a. The detailed configuration of the apparatus for controlling the operation of LEDs 100a according to the third embodiment of the present invention and the detailed method of operating the apparatus for controlling the operation of LEDs 100a are the same as those of the apparatus 10a for controlling the operation of LEDs according to the third embodiment of the present invention, and thus the detailed descriptions are omitted.

Furthermore, as shown in FIG. 10, when the magnitude of a positive voltage received from the AC power source 110a is higher than ⅓ of the total forward voltage of the LED array 120a, the third input current iQ3 is supplied to the LED array 120a. When the magnitude of the positive voltage is higher than ⅔ of the total forward voltage of the LED array 120a, the second input current iQ2 is supplied to the LED array 120a. When the magnitude of the positive voltage is higher than the total forward voltage of the LED array 120a, the first input current iQ1 is supplied to the LED array 120a. Accordingly, the input current Iac that operates the LED array 120a after being supplied by the AC power source 120a has a 3-level structure (that is, a 3-stage structure) through the vertical and horizontal adding-up of the first input current, the second input current, and the third input current. Accordingly, as shown in FIG. 10(b), the input current Iac may maintain a constant current even when the input voltage fluctuates, and may have a sine wave shape that is capable of suppressing harmonics and improving a power factor.

Figure 11:
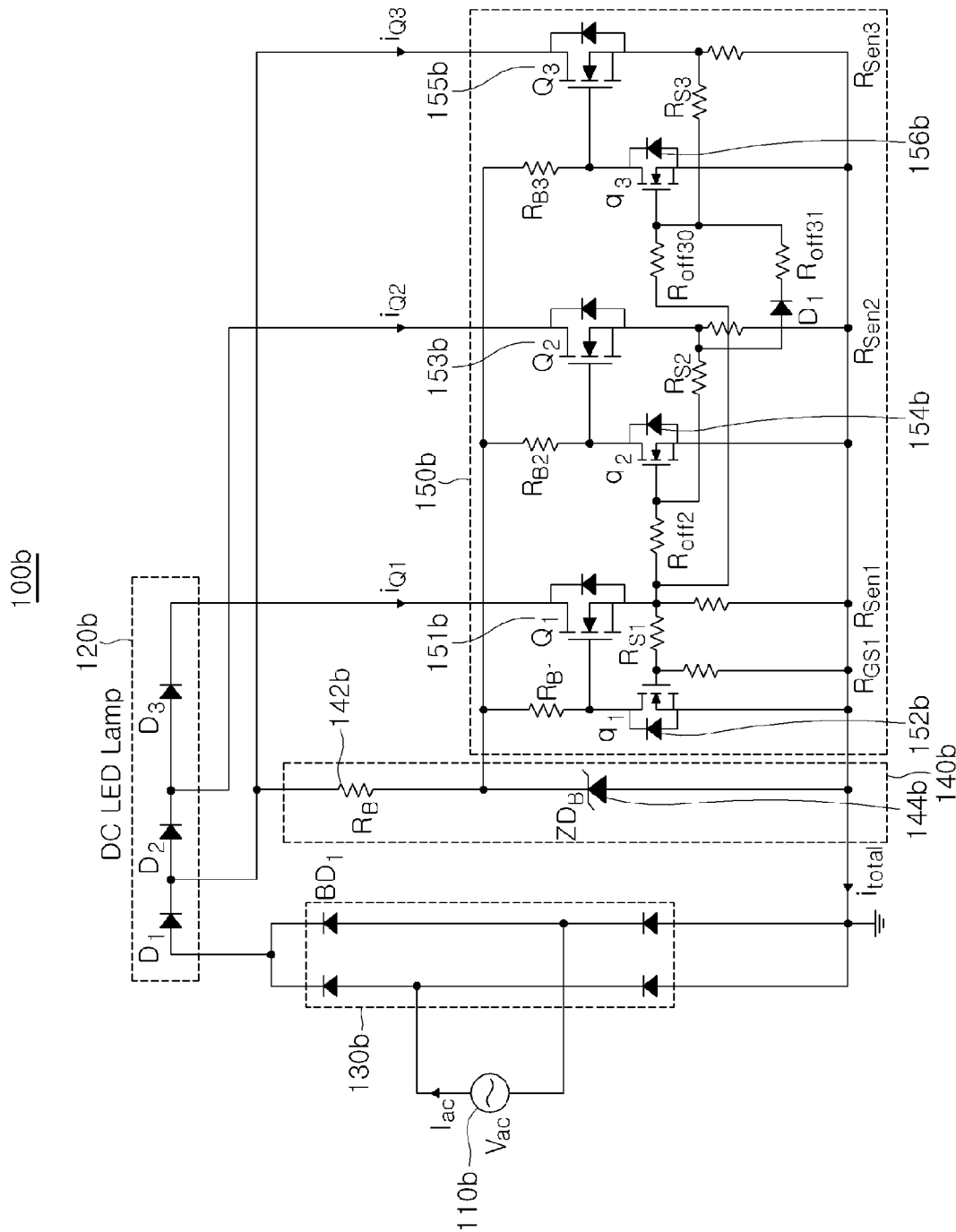
FIG. 11 is a circuit diagram of an apparatus for controlling the operation of LEDs according to a sixth embodiment of the present invention.
Figure 12:
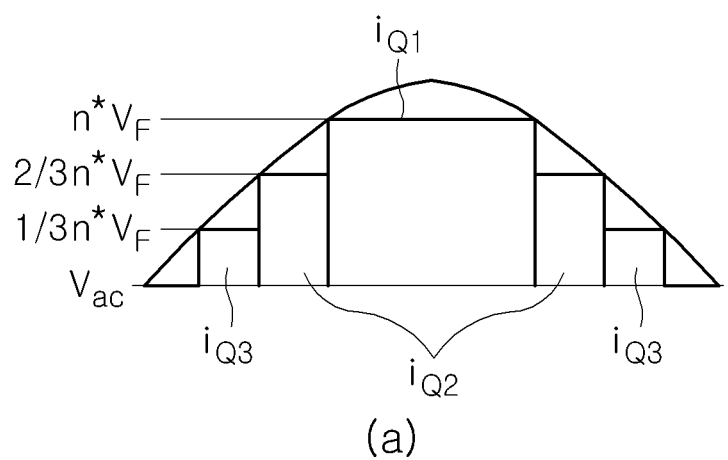
FIG. 12 is a reference diagram illustrating a current-voltage waveform according to a method of operating the apparatus for controlling the operation of LEDs according to the sixth embodiment of the present invention.
Figure 12:
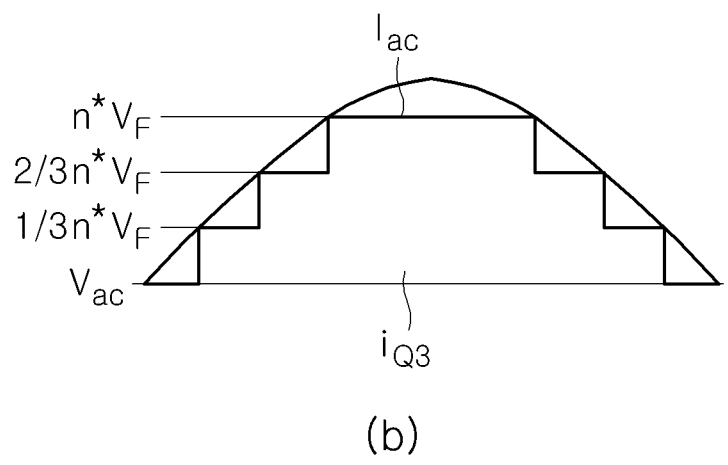

FIG. 11 is a circuit diagram of an apparatus for controlling the operation of LEDs according to a sixth embodiment of the present invention, and FIG. 12 is a reference diagram illustrating a current-voltage waveform according to a method of operating the apparatus for controlling the operation of LEDs according to the sixth embodiment of the present invention.

As shown in FIG. 11, the apparatus for controlling the operation of LEDs 110b according to the sixth embodiment of the present invention includes an AC power source 110b, an LED array 120b, a rectification unit 130b, an operation control voltage generation unit 140b, and an operating current control unit 150b.

In the apparatus for controlling the operation of LEDs 100b according to the sixth embodiment of the present invention, a plurality of input currents passing through at least one LED of the LED array 120b includes a first input current, a second input current, and a third input current. In order for an input current to have a 3-level structure (that is, a 3-stage structure) through the vertical adding-up of the first input current, the second input current, and the third input current, the operating current control unit 150b includes a first switch 151b, a first current control unit 152b, a second switch 153b, a second current control unit 154b, a third switch 155b, and a third current control unit 156b. The detailed configuration of the apparatus for controlling the operation of LEDs 101b according to the sixth embodiment of the present invention and the detailed method of operating the apparatus for controlling the operation of LEDs 110b are the same as those of the apparatus for controlling the operation of LEDs 10b according to the third embodiment of the present invention, and thus the detailed descriptions are omitted.

Furthermore, as shown in FIG. 12, when the magnitude of a positive voltage received from the AC power source 110b is higher than ⅓ of the total forward voltage of the LED array 120b, the third input current iQ3 is supplied to the LED array 120b. When the magnitude of the positive voltage is higher than ⅔ of the total forward voltage of the LED array 120b, the second input current iQ2 is supplied to the LED array 120b. When the magnitude of the positive voltage is higher than the total forward voltage of the LED array 120b, the first input current iQ1 is supplied to the LED array 120b. Accordingly, the input current Iac that operates the LED array 120b after being supplied by the AC power source 110a has a 3-level structure (that is, a 3-stage structure) through the vertical adding-up of the first input current, the second input current, and the third input current. Accordingly, as shown in FIG. 12(b), the input current Iac may maintain a constant current even when the input voltage fluctuates, and may have a sine wave shape that is capable of suppressing harmonics and improving a power factor.

Furthermore, although not shown, the apparatus for controlling the operation of LEDs according to the third to the sixth embodiments of the present invention may be configured using AC-operated LEDs in such a way as to construct an LED array using AC-operated LEDs so that the LED array includes a plurality of LED pairs connected in parallel in a backward direction and to construct the apparatus for controlling the operation of LEDs according to the third to sixth embodiments of the present invention.

Figure 13:
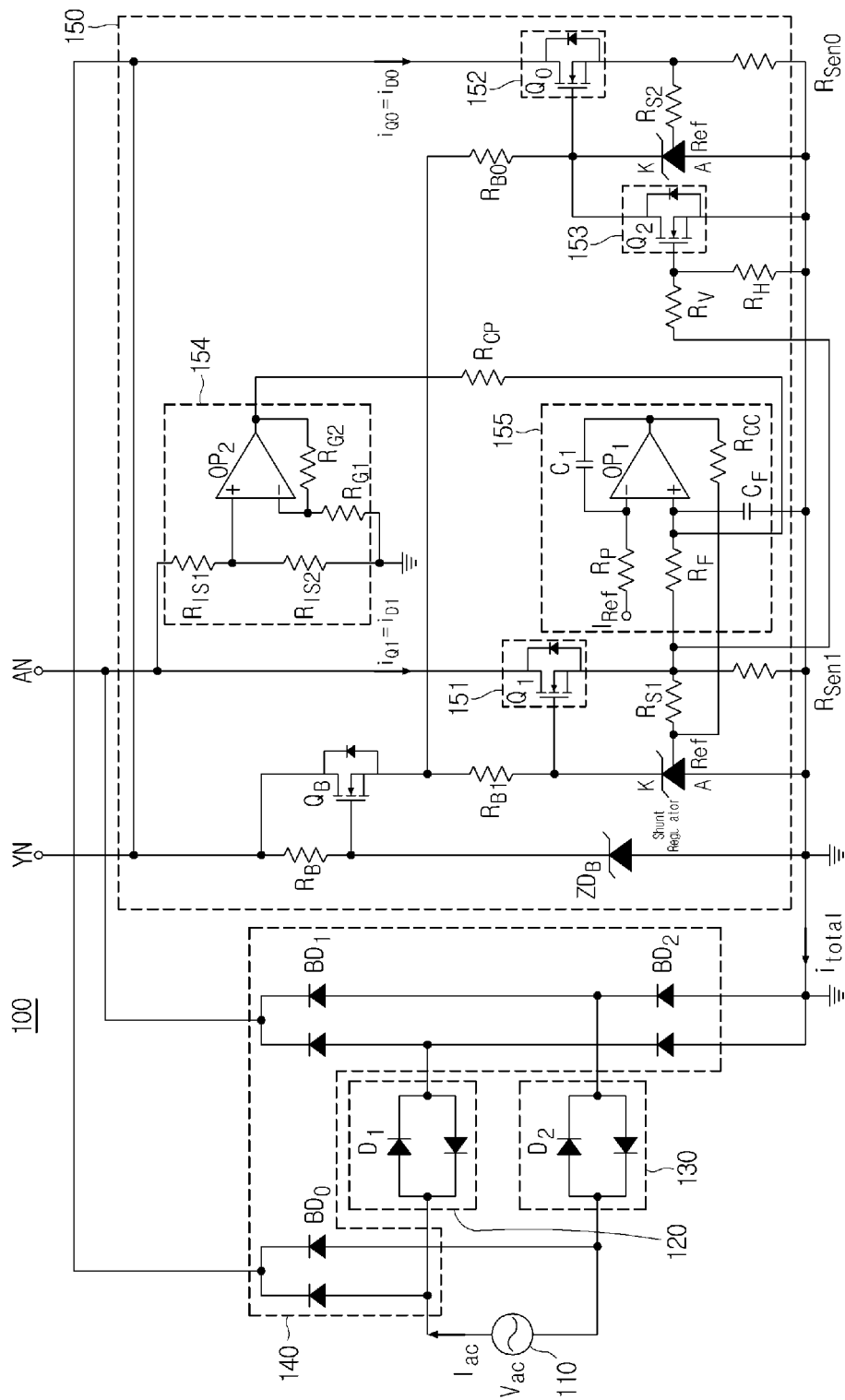
FIG. 13 is a circuit diagram of an apparatus for controlling the operation of LEDs according to a seventh embodiment of the present invention.

FIG. 13 is a circuit diagram of an apparatus for controlling the operation of LEDs according to a seventh embodiment of the present invention.

As shown in FIG. 13, the apparatus for controlling the operation of LEDs 100 according to the seventh embodiment of the present invention includes an AC power source 110, a first LED array 120, a second LED array 130, a rectification unit 140, and an operation control unit 150.

The AC power source 110 supplies AC power that operates the first LED array 120 and the second LED array 130.

The first LED array 120 has one side connected to the output side of the AC power source 110, and the second LED array 130 has one side connected to the input side of the AC power source 110.

Each of the first LED array 120 and the second LED array 130 may include one or more LED pairs connected in parallel in a backward direction. FIGS. 2 and 3 illustrate the first LED array 120 and the second LED array 130 each having one LED pair, but the number of LED pairs included in each of the first LED array 120 and the second LED array 130 is not limited to one.

The rectification unit 140 has an input side connected between the output side of the AC power source 110 and one side of the first LED array 120 and between the input side of the AC power source 110 and one side of the second LED array 130, and the rectification unit 140 is also connected to the other side of the first LED array 120 and to the other side of the second LED array 130. The rectification unit 140 rectifies an input current and outputs the rectified current.

A plurality of the rectification units 140 is included in response to the number of LED pairs included in each of the first LED array 120 and the second LED array 130. The rectification unit 140 may include a plurality of diode pairs each connected in parallel in a forward direction. The input side of each diode pair may be connected between the output side of the AC power source 110 and one side of the first LED array 120 and between the input side of the AC power source 110 and one side (that is, a diode pair BD0) of the second LED array 120. Furthermore, the input side of each diode pair may be connected to the other side of the first LED array 120, the other side (that is, a diode pair BD1) of the second LED array 130, and the output side (that is, a diode pair BD2) of the operation control unit 150.

The operation control unit 150 has an input side connected to the output side of the rectification unit 140. The operation control unit 150 controls the first LED array 120 and the second LED array 130 so that the first LED array 120 and the second LED array 130 are operated in response to a plurality of output currents which are output from the plurality of diode pairs of the rectification unit 140, input to the operation control unit 150, and then selectively input to the other sides of the first LED array 120 and the second LED array 130.

The operation control unit 150 includes a plurality of driving switches 151 and 152 configured to have input sides connected to the respective output sides of the diode pairs of the rectification unit 140 and to output the output currents of the diode pairs to the other side of the first LED array 120 and the other side of the second LED array 130.

Furthermore, the number of driving switches 151 and 152 included in the operation control unit 150 may be determined by the number of diode pairs included in the rectification unit 140.

The operation control unit 150 may further include a constant current control unit 155 configured to have an input side connected to the output side of the rectification unit 140 and to perform the constant current control of an output current output from the rectification unit 140, and a constant power control unit 154 configured to have an input side connected to the output side of the rectification unit 140 and to perform the constant power control of an output current output from the rectification unit 140.

A method of controlling a driving current, a method of performing the constant current control of a driving current, and a method of performing the constant power control of a driving current in the apparatus for controlling the operation of LEDs 100 according to the seventh embodiment of the present invention will be described below with reference to FIG. 13.

First, in the method of controlling a driving current in the apparatus for controlling the operation of LEDs 100 according to the seventh embodiment of the present invention, an input current $i_{D0}$ passing through the diode pair $BD_0$ of the rectification unit 140 is input to the driving switch 152 and an input current $i_{D1}$ passing through the diode pair BD1 of the first LED array 120 and the rectification unit 140 is input to the driving switch 151, in response to a change in an input voltage supplied by the AC power source 110.

Assuming that the sum of the input current $i_{D0}$ and the input current $i_{D1}$ is 100, the magnitude of the input current $i_{D1}$ supplied to the driving switch 151 is about 95, and the input current $i_{D1}$ functions as a main current that operates the first LED array 120 and the second LED array 130. The magnitude of the input current $i_{D0}$ supplied to the driving switch 152 is about 5, and the input current $i_{D0}$ functions as an auxiliary current that improves a power factor. An AC-operated LED apparatus 100 according to an embodiment of the present invention uses a vertical adding-up method or a horizontal adding-up method in generating a current close to a sine wave of n steps using the input current $i_{D0}$ or the input current $i_{D1}$.

First, in the case of the vertical adding-up method, when the input current $i_{D1}$ is input to the driving switch 151, the driving switch 151 is turned on so that the input current $i_{D1}$ is output. The driving switch 152 is turned off in response to the input current $i_{D0}$ input to the driving switch 152 so that the input current $i_{D0}$ is not output.

In this case, the driving switch 152 is turned off in response to the operation of an auxiliary switch 153 connected to the driving switch 152. That is, when the auxiliary switch 153 is in an ON state, the auxiliary switch 153 enters an OFF state, while when the auxiliary switch 153 is in an OFF state, the driving switch 152 enters an ON state.

Furthermore, a resistor $R_{sen1}$ senses the input current $i_{D1}$, that is, the main current, and operates at this voltage ($R_{sen1}$ voltage), and thus the auxiliary switch 153 may be operated through a resistor RV connected to the auxiliary switch 153.

Accordingly, the AC-operated LED apparatus 100 according to an embodiment of the present invention may selectively use the vertical adding-up method or the horizontal adding-up method depending on whether the resistor RV connected to the auxiliary switch 153 is used or not.

As described above, the reason why the apparatus for controlling the operation of LEDs 100 according to the seventh embodiment of the present invention uses the vertical adding-up method or the horizontal adding-up method will be described below. Although each of the first LED array 120 and the second LED array 130 of FIG. 13 has been illustrated as including only one LED pair, the configuration of the corresponding circuit is complicated if each of the first LED array 120 and the second LED array 130 includes a plurality of LED pairs as in FIGS. 14 to 21. For this reason, the horizontal adding-up method may be used to simplify the configuration of the corresponding circuit, and the vertical adding-up method may be used to efficiently generate a current close to a sine wave of n steps even though the configuration of the corresponding circuit is slightly complicated.

Furthermore, driving power for the operations of the driving switches 151 and 152 is produced in the form of stabilized power through elements $Q_B$, $R_B$, and $ZD_B$, is supplied as driving power for operating the driving switch 152 connected to the diode pair $BD_0$ of the rectification unit 140 through an element $R_{B0}$, and is then supplied as driving power for operating the driving switch 151 connected to the diode pair $BD_1$ of the rectification unit 140 through the element $R_{B1}$.

A detailed process of the vertical adding-up method or the horizontal adding-up method of the apparatus for controlling the operation of LEDs 100 according to the seventh embodiment of the present invention will be described below with reference to FIGS. 14 to 21.

A shunt regulator may restrict the input current $i_{D0}$ input to the driving switch 152 connected to the diode pair $BD_0$ of the rectification unit 140 and the input current $i_{D1}$ input to the driving switch 151 connected to the diode pair $BD_1$ of the rectification unit 140 by $2.5V/R_{sen0}$ and $2.5V/R_{sen1}$.

Next, in the method of performing the constant current control of the driving current of the apparatus for controlling the operation of LEDs 100 according to the seventh embodiment of the present invention, a predetermined reference current Iref is input to the negative terminal of the OP AMP $OP_1$ of the constant current control unit 155. A main current $i_{Q1}$, that is, an input current input to the driving switch 151 connected to the diode pair $BD_1$ of the rectification unit 140, is sensed and filtered and then input to the positive terminal of the OP AMP $OP_1$. The constant current control unit 155 compares the two currents $I_{ref}$ and $i_{Q1}$, input to the two terminals of the OP AMP $OP_1$, with each other.

If, as a result of the comparison, the main current higher than the reference current is sensed, constant current control may be performed by reducing the main current in such a manner that the output of the OP AMP $OP_1$ rises and the risen output value affects a shunt regulator Ref. If, as a result of the comparison, the main current lower than the reference current is sensed, constant current control may be performed by reducing the main current in such a manner that the output of the OP AMP $OP_1$ decreases and the decreased output value affects the shunt regulator Ref.

Furthermore, in the case of the method of performing the constant power control of the driving current of the apparatus for controlling the operation of LEDs 100 according to the seventh embodiment of the present invention, a value proportional to the input voltage may be obtained in such a manner that the constant power control unit 154 senses the input voltage output from the diode pair $BD_1$ of the rectification unit 140 using resistors $R_{JS1}$ and $R_{JS2}$ and amplifies the sensed input voltage using an OP AMP $OP_2$.

Furthermore, addition proportional to the input voltage is made to the positive terminal of the OP AMP $OP_1$, and thus constant power control may be performed so that a lower current is controlled in proportion to an increase in the input voltage in such a manner that the OP AMP $OP_1$ is controlled so that it has the same output even when an actual current is low.

In this case, the apparatus for controlling the operation of LEDs 100 according to the seventh embodiment of the present invention may basically operate in accordance with a constant current control method according to the constant current control unit 155, and may operate in accordance with a constant power control method according to the constant power control unit 154 only when a resistor $R_{CP}$ is inserted between the positive terminal of the OP AMP $OP_2$ of the constant power control unit 154 and the positive terminal of the OP AMP $OP_1$ of the constant current control unit 155.

The reason why the apparatus for controlling the operation of LEDs 100 according to the seventh embodiment of the present invention operates in accordance with the constant current control method or the constant power control method will be described below. As described above, the current $i_{D0}$ input to the driving switch 152 connected to the diode pair $B_{D0}$ of the rectification unit 140 and the current $i_{D1}$ input to the driving switch 151 connected to the diode pair $B_{D1}$ of the rectification unit 140 are restricted by the shunt regulator by $2.5V/R_{sen0}$ and $2.5V/R_{sen1}$, respectively, but an area through which a current flows is increased according to an increase of input voltage supplied by the AC power source 110. For example, when the input voltage rises 10%, the current rises 5% and power rises 15.5%. Accordingly, the reason is to prevent this problem.

Furthermore, in accordance with the apparatus for controlling the operation of LEDs 100 according to the seventh embodiment of the present invention, although the input voltage varies between $200 V_{ac}$ to $260 V_{ac}$ when constant current control is performed, a current may maintain a constant current characteristic between 39.9 mA to 40.2 mA. Although the input voltage varies between $200 V_{ac}$ to $260 V_{ac}$ when constant power control is performed, input power may maintain a constant power characteristic between 6.2 W to 6.9 W.

Furthermore, FIG. 13 illustrates only the two driving switches 151 and 152, the one constant power control unit 154, and the one constant current control unit 155, but the number of driving switches, the number of constant power control units, and the number of constant current control units are not limited thereto. A plurality of driving switches, a plurality of constant power control units, and a plurality of constant current control units may be used depending on the number of diode pairs of the rectification unit 140 that is determined by the number of LED pairs that form the first LED array 120 and the second LED array 130.

Furthermore, the configurations of the constant power control unit 154 and the constant current control unit 155 of the apparatus for controlling the operation of LEDs 100 of FIG. 13 according to the seventh embodiment of the present invention may be applied to the control of the first input current $i_{Q1}$ of the apparatus 10a for controlling the operation of LEDs of FIG. 2 according to the first embodiment of the present invention, the control of the first input current $i_{Q1}$ of the apparatus 10a for controlling the operation of LEDs of FIG. 5 according to the third embodiment of the present invention, the control of the first input current $i_{Q1}$ of the apparatus for controlling the operation of LEDs 10b of FIG. 7 according to the fourth embodiment of the present invention, the control of the first input current $i_{Q1}$ of the apparatus for controlling the operation of LEDs 10b of FIG. 9 according to the fourth embodiment of the present invention, and the control of the first input current $i_{Q1}$ of the apparatus for controlling the operation of LEDs 10b of FIG. 11 according to the fourth embodiment of the present invention.

Figure 14:
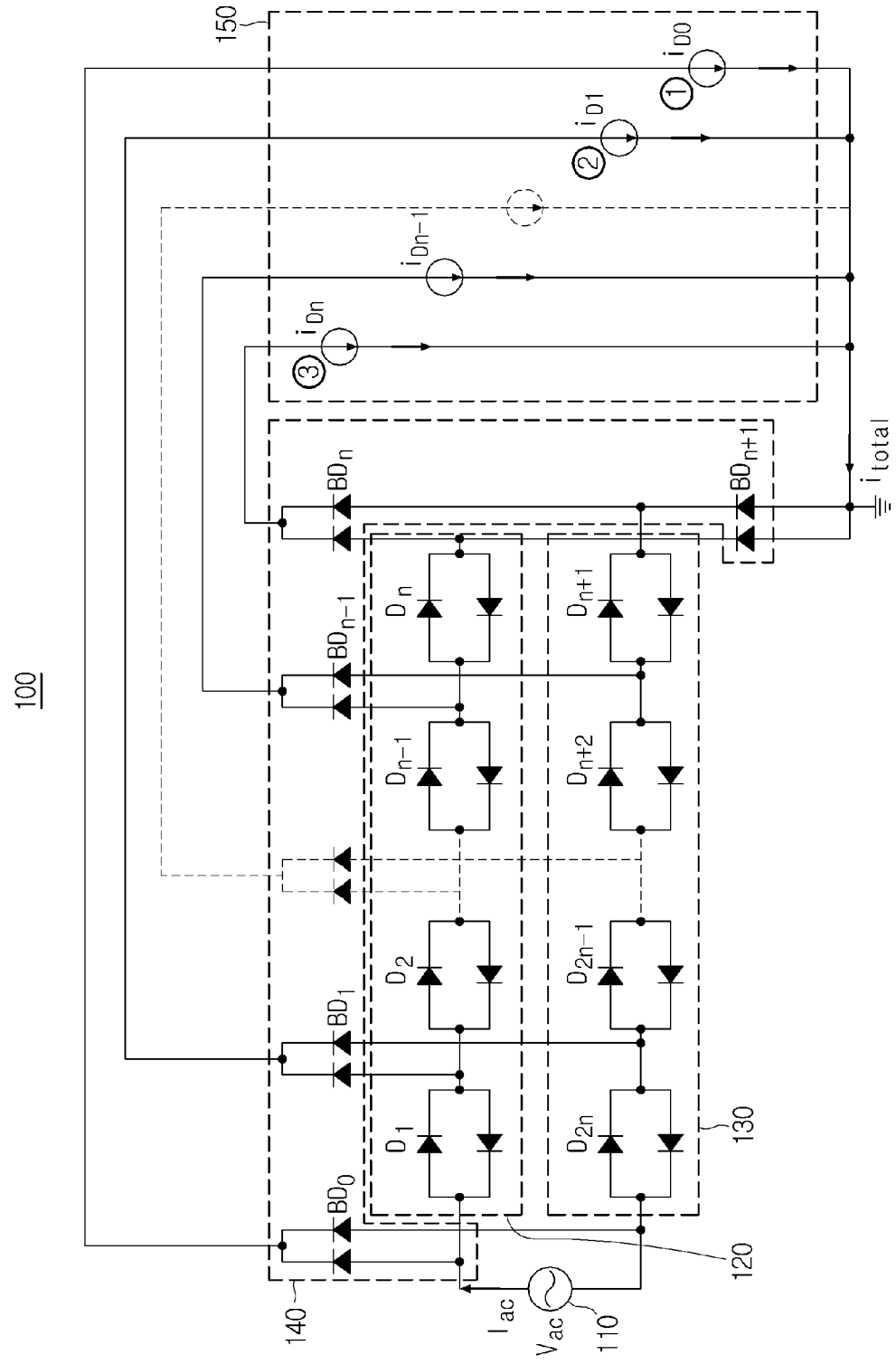
FIGS. 14 and 15 are reference circuit diagrams illustrating a method of controlling a driving current according to a first embodiment of the present invention.
Figure 15:
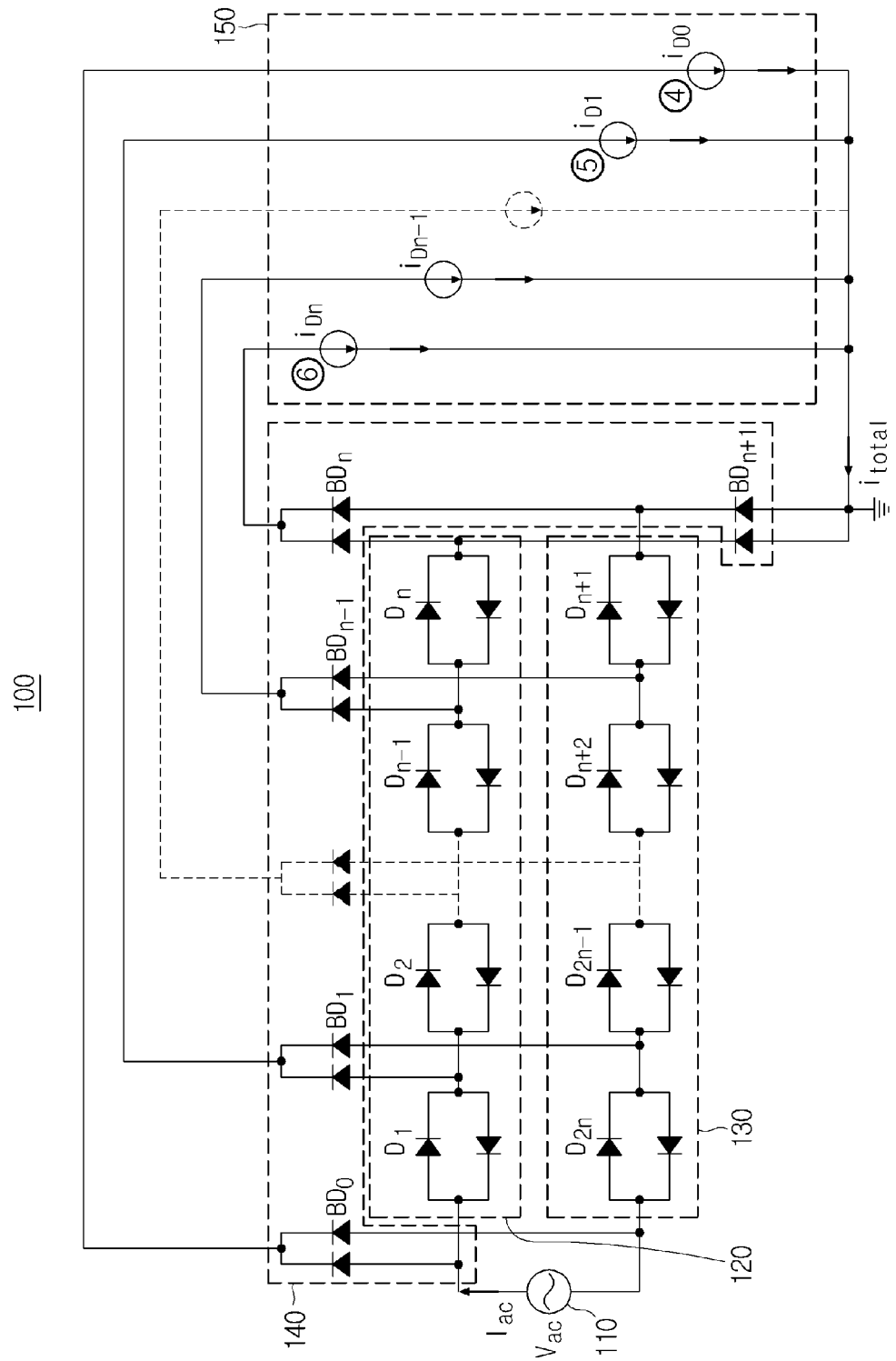
Figure 16:
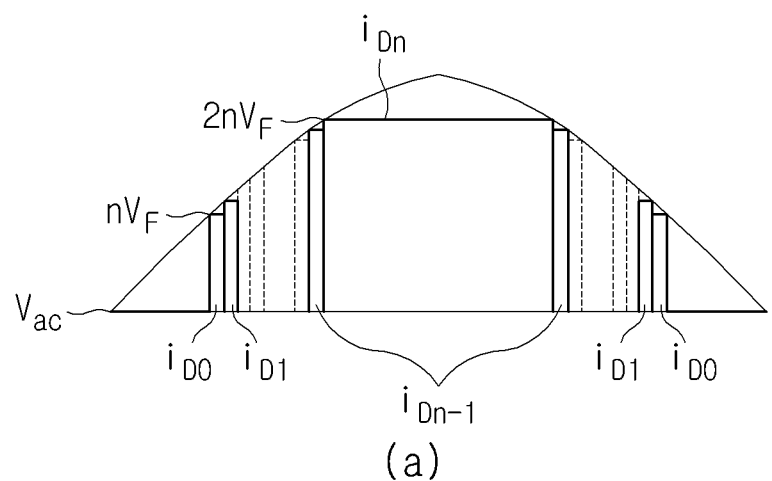
FIG. 16 is a current-voltage waveform graph based on the method of controlling a driving current according to the first embodiment of the present invention.
Figure 16:
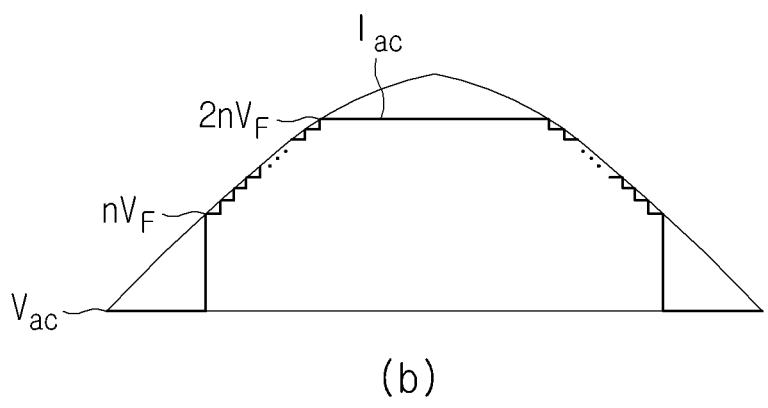

FIGS. 14 and 15 are reference circuit diagrams illustrating a method of controlling a driving current according to the first embodiment of the present invention, and FIG. 16 is a current-voltage waveform graph based on the method of controlling the driving current according to the first embodiment of the present invention.

The method of controlling the driving current according to the first embodiment of the present invention will be described below with reference to FIGS. 14 to 16.

FIGS. 14 to 16 illustrate that a current having a sine wave shape is generated using a vertical adding-up method by controlling a driving current when the apparatus for controlling the operation of LEDs 10b of FIG. 3 according to the second embodiment of the present invention is configured to have n steps. As shown in FIG. 14, if an input voltage supplied by the AC power source 110 is positive and the input voltage gradually rises and becomes higher than the forward voltage n*Vf of n LEDs, a constant current $i_{D0}$ that passes through the diode pairs $BD_0$ and $BD_{n+1}$ of the rectification unit 140 after being supplied by the AC power source 110 may flow through the operation control unit 150 ($\hat{1}$ of FIG. 14).

When the input voltage rises and becomes higher than a forward voltage (n+1)*Vf of (n+1) LEDs, a constant current $i_{D1}$ that passes through the diode pairs $BD_1$ and $BD_{n+1}$ of the rectification unit 140 after being supplied by the AC power source 110 may flow through the operation control unit 150 ($\hat{2}$ of FIG. 14).

In this case, if the constant current $i_{D1}$ flows through the operation control unit 150, the operation control unit 150 may operate as described above so that the constant current $i_{D0}$ does not flow through the operation control unit 150.

Furthermore, when the input voltage rises and become higher than the forward voltage 2n*Vf of 2n LEDs, a constant current $i_{Dn}$ that passes through the diode pairs $BD_n$ and $BD_{n+1}$ of the rectification unit 140 after being supplied by the AC power source 110 may flow through the operation control unit 150 ($\hat{3}$ of FIG. 14).

In this case, if the constant current $i_{Dn}$ flows through the operation control unit 150, the operation control unit 150 may operate as described above so that the remaining currents $i_{D0}$ to $i_{Dn-1}$ other than the constant current $i_{Dn}$ do not flow through the operation control unit 150.

That is, from a time-varying viewpoint, if an input voltage supplied by the AC power source 110 has a positive half cycle, a main current that operates the first LED array 120 and the second LED array 130 is $i_{Dn}$, and the remaining currents $i_{D0}$ to $i_{Dn-1}$ may function as auxiliary currents that improve a power factor.

As shown in FIG. 15, if an input voltage supplied by the AC power source 110 is negative and the input voltage gradually rises and becomes a forward voltage n*Vf of n LEDs, a constant current $i_{D0}$ that passes through the diode pairs $B_{D0}$ and $B_{Dn+1}$ of the rectification unit 140 after being supplied by the AC power source 110 may flow through the operation control unit 150 ($\hat{4}$ of FIG. 15).

When the input voltage rises and becomes higher than a forward voltage (n+1)*Vf of (n+1) LEDs, a constant current $i_{D1}$ that passes through the diode pairs $B_{D1}$ and $B_{Dn+1}$ of the rectification unit 140 after being supplied by the AC power source 110 may flow through the operation control unit 150 ($\hat{5}$ of FIG. 15).

In this case, if the constant current $i_{D1}$ flows through the operation control unit 150, the operation control unit 150 may operate as described above so that the constant current $i_{D0}$ does not flow through the operation control unit 150.

Furthermore, when the input voltage rises and becomes higher than a forward voltage 2n*Vf of (2n) LEDs, the constant current $i_{Dn}$ that passes through the diode pairs $BD_n$ and $BD_{n+1}$ of the rectification unit 140 after being supplied by the AC power source 110 may flow through the operation control unit 150 ($\hat{6}$ of FIG. 15).

In this case, if the constant current $i_{Dn}$ flows through the operation control unit 150, the operation control unit 150 may operate as described above so that the remaining currents $i_{D0}$ to $i_{Dn-1}$ do not flow through the operation control unit 150.

That is, from a time-varying viewpoint, if the input voltage supplied by the AC power source 110 has a negative half cycle, a main current that operates the first LED array 120 and the second LED array 130 is $i_{Dn}$, and the remaining currents $i_{D0}$ to $i_{Dn-1}$ may function as auxiliary currents that improve a power factor.

Accordingly, in accordance with the method of controlling a driving current according to the first embodiment of the present invention, the total current can have currents close to a sine wave shape having n steps shown in FIG. 16(b) according to the vertical adding-up method of FIG. 16(a), and each of the currents is adjusted to a more accurate constant current through control of the operation control unit 150 of FIG. 13. Accordingly, the occurrence of a flicker phenomenon can be suppressed to some extent although the input voltage fluctuates, and the occurrence of a flicker phenomenon can be fully suppressed by adding a constant current function.

Furthermore, constant power control can be selectively performed on each current through control of the operation control unit 150 of FIG. 13. In such a case, a loss at a rated voltage or higher can be reduced.

Figure 17:
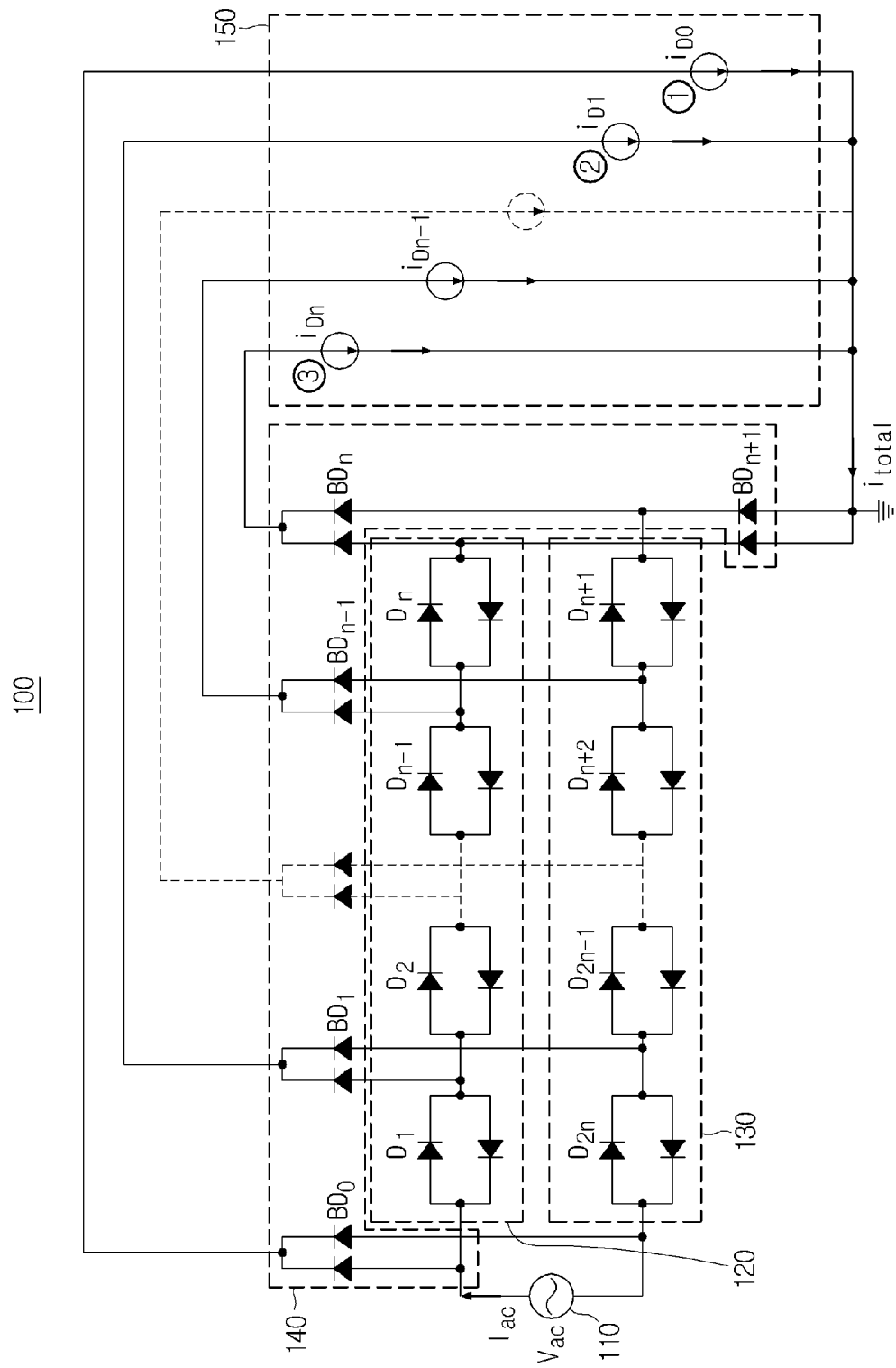
FIGS. 17 and 18 are reference circuit diagrams illustrating a method of controlling a driving current according to a second embodiment of the present invention.
Figure 18:
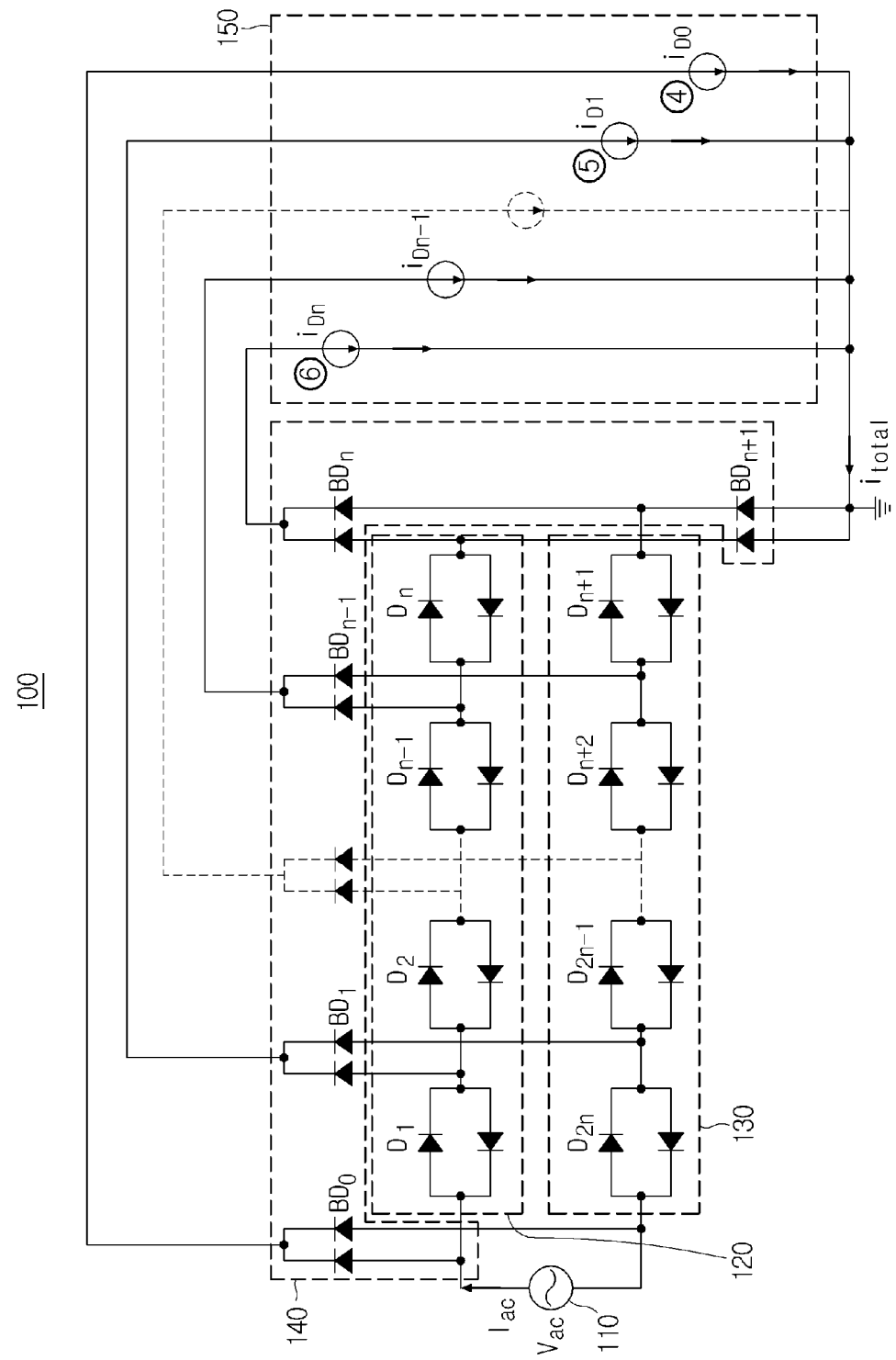
Figure 19:
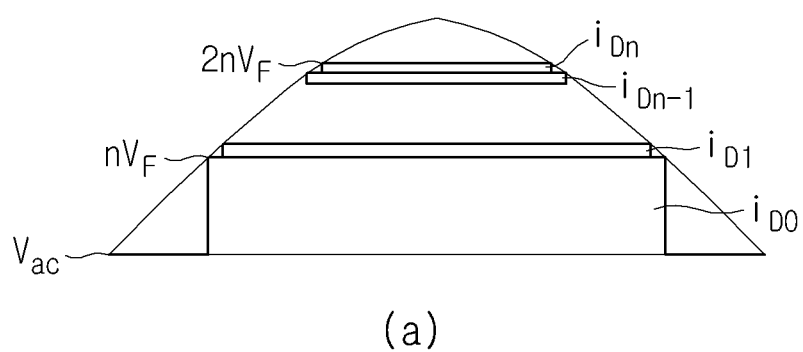
FIG. 19 is a current-voltage waveform graph based on a method of controlling a driving current according to a second embodiment of the present invention.
Figure 19:
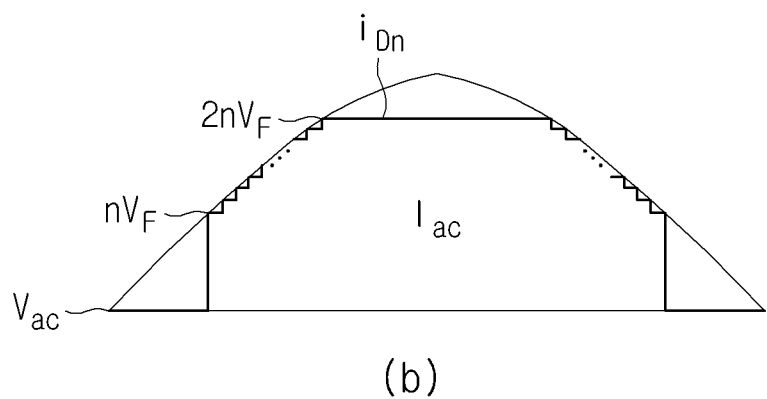

FIGS. 17 and 18 are reference circuit diagrams illustrating a method of controlling a driving current according to a second embodiment of the present invention, and FIG. 19 is a current-voltage waveform graph based on the method of controlling the driving current according to the second embodiment of the present invention.

FIGS. 17 to 19 illustrate that a current having a sine wave shape is generated using a horizontal adding-up method by controlling a driving current when the apparatus for controlling the operation of LEDs 10b of FIG. 3 according to the second embodiment of the present invention is configured to have n steps. As shown in FIG. 17, if an input voltage supplied by the AC power source 110 is positive and the input voltage gradually rises and becomes higher than a forward voltage n*Vf of n LEDs, an input current $i_{D0}$ that passes through the diode pairs $BD_0$ and $BD_{n+1}$ of the rectification unit 140 after being supplied by the AC power source 110 may flow through the operation control unit 150 ($\hat{1}$ of FIG. 17).

When the input voltage rises and becomes higher than a forward voltage (n+1)*Vf of (n+1) LEDs, an input current $i_{D1}$ that passes through the diode pairs $BD_1$ and $BD_{n+1}$ of the rectification unit 140 after being supplied by the AC power source 110 may flow through the operation control unit 150 ($\hat{2}$ of FIG. 17).

In this case, if the input current $i_{D1}$ flows through the operation control unit 150, the operation control unit 150 may operate as described above so that the input current $i_{D0}$ does not flow through the operation control unit 150.

Furthermore, when the input voltage rises and become higher than a forward voltage 2n*Vf of (2n) LEDs, an input current $i_{Dn}$ that passes through the diode pairs $BD_n$ and $BD_{n+1}$ of the rectification unit 140 after being supplied by the AC power source 110 may flow through the operation control unit 150 ($\hat{3}$ of FIG. 17).

In this case, if the input current $i_{Dn}$ flows through the operation control unit 150, the operation control unit 150 may operate as described above so that the remaining currents $i_{D0}$ to $i_{Dn-1}$ other than the input current $i_{Dn}$ flow through the operation control unit 150.

That is, from a time-varying viewpoint, if an input voltage supplied by the AC power source 110 has a positive half cycle, a main current that operates the first LED array 120 and the second LED array 130 is $i_{Dn}$, and the remaining currents $i_{D0}$ to $i_{Dn-1}$ may function as auxiliary currents that improve a power factor.

As shown in FIG. 18, if an input voltage supplied by the AC power source 110 is negative and the input voltage gradually rises and becomes a forward voltage n*Vf of n LEDs, an input current $iD_0$ that passes through the diode pairs $BD_0$ and $BD_{n+1}$ of the rectification unit 140 after being supplied by the AC power source 110 may flow through the operation control unit 150 ($\hat{4}$ of FIG. 18).

When the input voltage rises and becomes higher than a forward voltage (n+1)*Vf of (n+1) LEDs, an input current $i_{D1}$ that passes through the diode pairs $BD_1$ and $BD_{n+1}$ of the rectification unit 140 after being supplied by the AC power source 110 may flow through the operation control unit 150 ($\hat{5}$ of FIG. 18).

In this case, if the input current $i_{D1}$ flows through the operation control unit 150, the operation control unit 150 may operate as described above so that the input current $i_{D0}$ continues to flow through the operation control unit 150.

Furthermore, when the input voltage rises and becomes higher than a forward voltage 2n*Vf of (2n) LEDs, the input current $i_{Dn}$ that passes through the diode pairs $BD_n$ and $BD_{n+1}$ of the rectification unit 140 after being supplied by the AC power source 110 may flow through the operation control unit 150 ($\hat{6}$ of FIG. 18).

In this case, if the input current $i_{Dn}$ flows through the operation control unit 150, the operation control unit 150 can operate as described above so that the remaining currents $i_{D0}$ to $i_{Dn-1}$ other than the input current $i_{Dn}$ continue to flow through the operation control unit 150.

That is, from a time-varying viewpoint, if the input voltage supplied by the AC power source 110 has a negative half cycle, a main current that operates the first LED array 120 and the second LED array 130 is $i_{Dn}$, and the remaining currents $i_{D0}$ to $i_{Dn-1}$ may function as auxiliary currents that improve a power factor.

Accordingly, in accordance with the method of controlling a driving current according to the second embodiment of the present invention, the total current can have currents close to a sine wave shape having n steps shown in FIG. 19(b) according to the horizontal adding-up method of FIG. 19(a), and each of the currents is controlled to a more accurate constant current through control of the operation control unit 150 of FIG. 13. Accordingly, the occurrence of a flicker phenomenon can be suppressed to some extent even when the input voltage fluctuates, and the occurrence of a flicker phenomenon can be fully suppressed by adding an input current function.

Furthermore, constant power control can be selectively performed on each current through control of the operation control unit 150 of FIG. 13. In such a case, the loss at a voltage equal to or higher than a rated voltage can be reduced.

Figure 20:
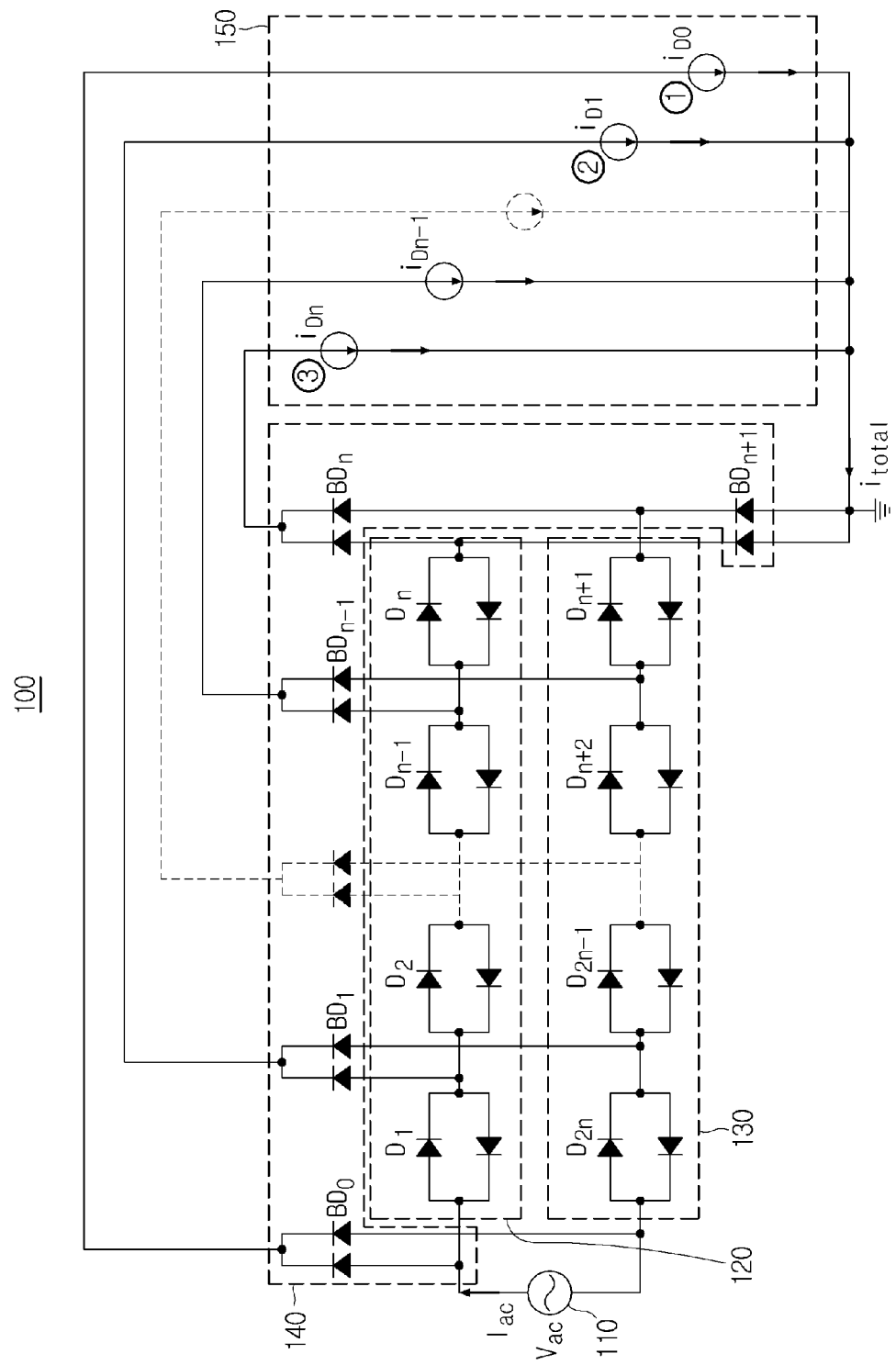
FIG. 20 is a reference circuit diagram illustrating a method of controlling a driving current according to a third embodiment of the present invention.
Figure 21:
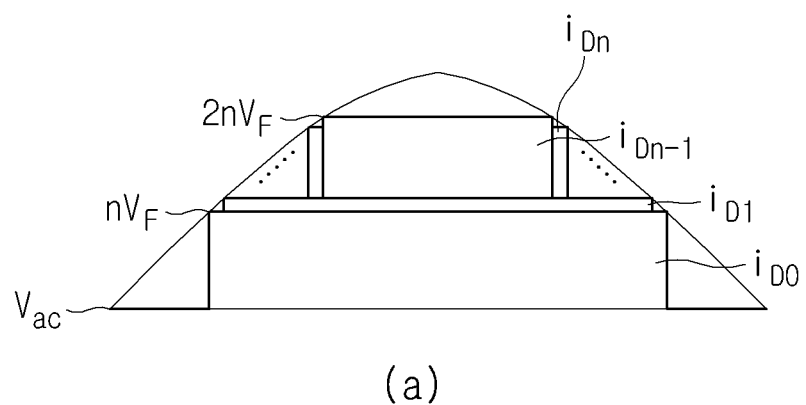
FIG. 21 is a current-voltage waveform graph based on the method of controlling a driving current according to the third embodiment of the present invention.
Figure 21:
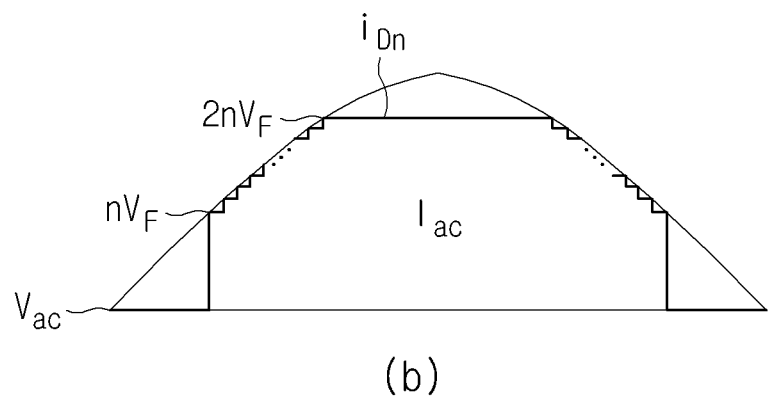

FIG. 20 is a reference circuit diagram illustrating a method of controlling a driving current according to a third embodiment of the present invention, and FIG. 21 is a current-voltage waveform graph based on the method of controlling the driving current according to the third embodiment of the present invention.

The method of controlling the driving current according to the third embodiment of the present invention will be described below with reference to FIGS. 20 and 21.

FIGS. 19 to 21 illustrate that a current having a sine wave shape is generated using a combination of the vertical adding-up method and horizontal adding-up method by controlling a driving current if the apparatus for controlling the operation of LEDs 10b of FIG. 3 according to the second embodiment of the present invention is configured to have n steps. As shown in FIG. 20, if an input voltage supplied by the AC power source 110 is positive and the input voltage gradually rises and becomes higher than a forward voltage n*Vf of n LEDs, an input current $i_{D0}$ that passes through the diode pairs $BD_0$ and $BD_{n+1}$ of the rectification unit 140 after being supplied by the AC power source 110 may flow through the operation control unit 150 (①of FIG. 20).

When the input voltage rises and becomes higher than a forward voltage (n+1)*Vf of (n+1) LEDs, an input current $i_{D1}$ that passes through the diode pairs $BD_1$ and $BD_{n+1}$ of the rectification unit 140 after being supplied by the AC power source 110 may flow through the operation control unit 150 (② of FIG. 20).

In this case, if the input current $i_{D1}$ flows through the operation control unit 150, the operation control unit 150 may operate as described above so that the input current $i_{DO}$ does not flow through the operation control unit 150.

Furthermore, when the input voltage rises and become higher than the forward voltage 2n*Vf of (2n) LEDs, an input current $i_{Dn}$ that passes through the diode pairs $BD_n$ and $BD_{n+1}$ of the rectification unit 140 after being supplied by the AC power source 110 may flow through the operation control unit 150 (③ of FIG. 20).

In this case, if the input current $i_{Dn}$ flows through the operation control unit 150, the operation control unit 150 may operate as described above so that some input currents $i_{DO}$ and $I_{D1}$ of the remaining input currents other than the input current $i_{Dn}$ flow through the operation control unit 150, and the remaining input currents $i_{DN-2}$ and $i_{Dn-1}$ other than the some input currents $i_{DO}$ and $I_{D1}$ do not flow through the operation control unit 150.

That is, from a time-varying viewpoint, in accordance with the method of driving the AC-operated LED apparatus according to the third embodiment of the present invention, main currents that drive the first LED array 120 and the second LED array 130 are $i_{D0}$ and $i_{DN}$, and the remaining currents $i_{D1}$, $i_{DN-2}$, and $i_{Dn-1}$ may function as auxiliary currents that improve a power factor.

Accordingly, in accordance with the method of controlling a driving current according to the third embodiment of the present invention, the total current may have currents close to a sine wave shape having n steps shown in FIG. 21(b) using a combination of the vertical adding-up method and horizontal adding-up method of FIG. 21(a), and each of the currents is adjusted to a more accurate constant current through the control of the operation control unit 150 of FIG. 14. Accordingly, the occurrence of a flicker phenomenon can be suppressed to some extent even when an input voltage fluctuates, and the occurrence of a flicker phenomenon can be fully suppressed by adding an input current function.

The above description is intended merely to illustrate the technical spirit of the present invention. It will be apparent to those having ordinary knowledge in the art to which the present invention pertains that various modifications, variations and replacements are possible within the range that does not depart from the scope of the essential features of the present invention. Accordingly, the disclosed embodiments and the accompanying drawings are not intended to limit the technical spirit of the present invention, but are intended to illustrate the present invention. The scope of the technical spirit of the present invention is not limited by the embodiments and the accompanying drawings. The range of protection of the present invention should be defined based only on the claims, and all technical spirits equivalent to the claims should be interpreted as being included in the range of protection of the present invention.

What is claimed is:

1. An apparatus for controlling the operation of LEDs using an AC power source, comprising:
   a first LED array configured to have a first side connected to an output side of the AC power source;
   a second LED array configured to have a first side connected to an input side of the AC power source;
   a rectification unit configured to have an input side connected between the output side of the AC power source and the first side of the first LED array, between the input side of the AC power source and the first side of the second LED array, to a second side of the first LED array, and to a second side of the second LED array; and
   an operation control unit configured to have an input side connected to an output side of the rectification unit and an output side connected to the input side of the rectification unit and to control a plurality of input currents output from the rectification unit and then received through the input side of the operation control unit so that the plurality of input currents is selectively output to the second side of the first LED array and the second side of the second LED array.

2. The apparatus of claim 1, wherein each of the first LED array and the second LED array comprises one or more LED pairs connected in parallel in a backward direction.

3. The apparatus of claim 2, wherein the rectification unit comprises a plurality of diode pairs connected in parallel in a forward direction, and input sides of each of the diode pairs are connected between the output side of the AC power source and the first side of the first LED array and between the input side of the AC power source and the first side of the second LED array, respectively, to the second side of the first LED array and to the second side of the second LED array, respectively, and to the output side of the operation control unit.

4. The apparatus of claim 3, wherein the operation control unit comprises a plurality of driving switches each connected to the output side of each of the diode pairs and configured to receive a current from each diode pair and output the received current to the second side of the first LED array and the second side of the second LED array.

5. The apparatus of claim 4, wherein the plurality of driving switches selectively output the plurality of input currents, received through the input side of the operation control unit from the plurality of diode pairs, to the second side of the first LED array and the second side of the second LED array by performing an ON or OFF operation.

6. The apparatus of claim 5, wherein the operation control unit further comprises a constant power control unit configured to have an input side connected to the output side of the rectification unit and to perform constant power control of the input current that is output from one or more turned-on driving switches of the plurality of driving switches to the second side of the first LED array and the second side of the second LED array.

7. The apparatus of claim 5, wherein the operation control unit further comprises a constant current control unit configured to have an input side connected to the output side of the rectification unit and to perform constant current control of the input current that is output from one or more turned-on driving switches of the plurality of driving switches to the second side of the first LED array and the second side of the second LED array.

8. A method of controlling a driving current of an apparatus for controlling operation of LEDs, the apparatus being operated by an AC power source and including a plurality of LED arrays, a rectification unit, and an operation control unit, the method comprising the steps of:
   (a) comparing a magnitude of a predetermined reference current with magnitudes of a plurality of input currents input to the operation control unit through the rectification unit or the plurality of LED arrays in response to a change in magnitude of an input voltage supplied by the AC power source;
   (b) if, as a result of the comparison, at least one input current higher than the reference current is sensed, decreasing the magnitude of the at least one sensed input current, and performing constant current control of the at least one sensed input current; and (c) if, as a result of the comparison, at least one input current lower than the reference current is sensed, increasing the magnitude of the at least one sensed input current, and performing constant current control of the at least one sensed input current.

9. The method of claim 8, wherein the constant current control of the at least one sensed input current is performed by at least one shunt regulator provided in the operation control unit.

* * * * *